(12) United States Patent
Sasaki et al.

(10) Patent No.: US 8,581,863 B2
(45) Date of Patent: Nov. 12, 2013

(54) LIQUID CRYSTAL DISPLAY PANEL AND LIQUID CRYSTAL DISPLAY APPARATUS

(75) Inventors: Kazuhiro Sasaki, Sagamihara (JP);
Makoto Iwasaki, Akishima (JP);
Toshiharu Nishino, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 654 days.

(21) Appl. No.: 12/764,317

(22) Filed: Apr. 21, 2010

(65) Prior Publication Data

US 2010/0302227 A1 Dec. 2, 2010

(30) Foreign Application Priority Data

May 29, 2009 (JP) ................................. 2009-130530

(51) Int. Cl.
*G06F 3/041* (2006.01)
(52) U.S. Cl.
USPC ......................................................... 345/173
(58) Field of Classification Search
USPC ......................................... 345/173, 174, 175
See application file for complete search history.

(56) References Cited

U.S. PATENT DOCUMENTS

| 4,345,248 | A * | 8/1982 | Togashi et al. ................... 345/90 |
| 8,115,746 | B2 * | 2/2012 | Tsai et al. ........................ 345/173 |
| 2005/0253829 | A1 * | 11/2005 | Mamba et al. ................. 345/204 |
| 2008/0018581 | A1 * | 1/2008 | Park et al. ........................ 345/98 |
| 2008/0129898 | A1 * | 6/2008 | Moon ............................. 349/12 |
| 2009/0002312 | A1 | 1/2009 | Son |
| 2009/0002336 | A1 * | 1/2009 | Choi et al. ..................... 345/174 |
| 2009/0050376 | A1 | 2/2009 | Jeon et al. |
| 2009/0201259 | A1 * | 8/2009 | Nurmi ........................... 345/173 |
| 2009/0289912 | A1 | 11/2009 | Chen et al. |

FOREIGN PATENT DOCUMENTS

| CN | 101256293 A | 9/2008 |
| JP | 2007-058070 A | 3/2007 |
| JP | 2007-95044 A | 4/2007 |
| JP | 2007-128091 A | 5/2007 |
| JP | 2008-122913 A | 5/2008 |
| JP | 2008-217010 A | 9/2008 |
| JP | 2009-282520 A | 12/2009 |
| KR | 10-2009-0000484 A | 1/2009 |
| KR | 10-2009-0019545 A | 2/2009 |

OTHER PUBLICATIONS

Korean Office Action dated Aug. 8, 2011 (and English translation thereof) in counterpart Korean Application No. 10-2010-0042376.
Japanese Office Action dated May 24, 2011 (and English translation thereof) in counterpart Japanese Application No. 2009-130530.
Chinese Office Action dated Sep. 6, 2012 (and English translation thereof) in counterpart Chinese Application No. 201010193401.5.

* cited by examiner

*Primary Examiner* — William Boddie
*Assistant Examiner* — Sahlu Okebato
(74) *Attorney, Agent, or Firm* — Holtz, Holtz, Goodman & Chick, PC

(57) ABSTRACT

A liquid crystal display panel in which coordinate detection electrodes are formed on a first substrate and protruding contact portions are formed on a second substrate as a touch panel function includes a conversion circuit formed therein. The conversion circuit subjects information indicative of whether the protruding contact portions are in contact with the coordinate detection electrodes to parallel/serial conversion to output the converted information to the coordinate detection circuit.

13 Claims, 20 Drawing Sheets

LIQUID CRYSTAL DISPLAY PANEL AND LIQUID CRYSTAL DISPLAY APPARATUS

CROSS-REFERENCE TO RELATED APPLICATIONS

This application is based upon and claims the benefit of priority from prior Japanese Patent Application No. 2009-130530, filed May 29, 2009, the entire contents of which are incorporated herein by reference.

BACKGROUND OF THE INVENTION

1. Field of the Invention

The present invention relates to a liquid crystal display panel and a liquid crystal display apparatus.

2. Description of the Related Art

As an active matrix liquid crystal display apparatus using a thin-film transistor as an active element, there is one having a touch panel function. For example, in a liquid crystal display apparatus disclosed in JP-A 2007-95044 (KOKAI), a liquid crystal display panel also serves a touch panel function. Specifically, the liquid crystal display panel includes a first substrate and a second substrate that face each other through a liquid crystal layer. Further, on the first substrate, pixel electrodes, thin-film transistors connected with the pixel electrodes so that each transistor corresponds to each pixel electrode, scanning lines, and signal lines are provided. Furthermore, on the first substrate, X coordinate detection lines that are utilized to detect an X coordinate (a coordinate having an extending direction of the scanning lines as an axis) of a touch point, Y coordinate detection lines that are utilized to detect a Y coordinate (a coordinate having an extending direction of the signal lines as an axis) of a touch point, X coordinate detection electrodes arranged to be connected with the X coordinate detection lines, and Y coordinate detection electrodes arranged to be connected with the Y coordinate detection lines are provided. Moreover, on the second substrate, in addition to an opposed electrode provided to face the pixel electrodes, protruding contact portions are formed at positions corresponding to the X coordinate detection electrodes or positions corresponding to the Y coordinate detection electrodes. Here, the protruding contact portions are formed so that they do not come into contact with the X coordinate detection electrodes or the Y coordinate detection electrodes in a steady state and that they come into contact with the X coordinate detection electrodes or the Y coordinate detection electrodes when the second substrate is touched from the outside (by pressing force from the outside) to undergo flexural deformation. Additionally, when the protruding contact point comes into contact with the X coordinate detection electrode or the Y coordinate detection electrode, the X coordinate detection line or the Y coordinate detection line is charged with a common signal applied to the opposed electrode via the X coordinate detection electrode or the Y coordinate detection electrode. That is, in the liquid crystal display apparatus having the touch panel function, an X coordinate of a touch point is detected by detecting the X coordinate detection line charged with the common signal in the X coordinate detection lines, and a Y coordinate of the touch point is detected by detecting the Y coordinate detection line charged with the common signal in the Y coordinate detection lines.

However, in the liquid crystal display apparatus having the above-described touch panel function, a coordinate detection circuit that detects an X coordinate detection line charged with a common signal is formed separately from the liquid crystal display panel, and the X coordinate detection lines are individually connected with the coordinate detection circuit in accordance with each X coordinate detection line, resulting in a problem that connection terminals that are equal to the X coordinate detection lines in number are required to detect the X coordinate.

Further, likewise, a coordinate detection circuit that detects a Y coordinate detection line charged with a common signal is formed separately from the liquid crystal display panel, and the Y coordinate detection lines are individually connected with the coordinate detection circuit in accordance with each Y coordinate detection line, resulting in a problem that connection terminals equal to the Y coordinate detection lines in number are required to detect the Y coordinate.

BRIEF SUMMARY OF THE INVENTION

An object of the present invention is to provide a liquid crystal display panel and a liquid crystal display apparatus in which, though the liquid crystal display panel performs the touch panel function, the number of connection terminals of the liquid crystal display panel and the coordinate detection circuit are reduced to be smaller than the number of detectable coordinate points.

A liquid crystal display panel according to an aspect of the present invention includes pixel electrodes which are connected with pixel transistors and arranged to face an opposed electrode through a liquid crystal layer per each pixel and changes an alignment direction of liquid crystal molecules in the liquid crystal layer by controlling a voltage between the pixel electrodes and the opposed electrode. The liquid crystal display panel further includes scanning lines which extend in parallel to each other and through which ON signals for turning on respective corresponding pixel transistors during a predetermined period are supplied to the respective corresponding pixel transistors, first coordinate detection electrodes which are arranged in a predetermined direction and some of which correspond to the scanning lines different from each other, and first coordinate detection transistors which electrically connect the first coordinate detection electrodes corresponding to the scanning lines to a first output line commonly connected with the first coordinate detection transistors based on the ON signals supplied to the pixel transistors from the scanning lines.

A liquid crystal display panel according to another aspect of the present invention includes pixel electrodes which are connected with pixel transistors and arranged to face an opposed electrode through a liquid crystal layer per each pixel and changes an alignment direction of liquid crystal molecules in the liquid crystal layer by controlling a voltage between the pixel electrodes and the opposed electrode. The liquid crystal display panel further includes scanning lines which extend in parallel to each other and through which ON signals for turning on respective corresponding pixel transistors during a predetermined period are supplied to the respective corresponding pixel transistors, first coordinate detection lines which extend in parallel to each other and correspond to the scanning lines different from each other, and first coordinate detection transistors which electrically connect the first coordinate detection lines corresponding to the scanning lines to a first output line commonly connected with the first coordinate detection transistors based on the ON signals supplied to the pixel transistors from the scanning lines.

A liquid crystal display panel according to another aspect of the present invention includes pixel electrodes which are connected with pixel transistors and arranged to face an opposed electrode through a liquid crystal layer per each pixel and changes an alignment direction of liquid crystal molecules in the liquid crystal layer by controlling a voltage between the pixel electrodes and the opposed electrode. The liquid crystal display panel further includes a scan driver which sequentially outputs ON signals for turning on the pixel transistors during a predetermined period to scanning lines extending in parallel to each other, first coordinate detection electrodes which are arranged in a predetermined direction and some of which correspond to the scanning lines different from each other, and first coordinate detection transistors which electrically connect the first coordinate detection electrodes corresponding to the scanning lines to a first output line commonly connected with the first coordinate detection transistors based on the ON signals output to the scanning lines. The pixel transistors, the first coordinate detection transistors, and the first output line are formed on the same substrate.

A liquid crystal display panel according to another aspect of the present invention includes pixel electrodes which are connected with pixel transistors and arranged to face an opposed electrode through a liquid crystal layer per each pixel and changes an alignment direction of liquid crystal molecules in the liquid crystal layer by controlling a voltage between the pixel electrodes and the opposed electrode. The liquid crystal display panel further includes a scan driver which sequentially outputs ON signals for turning on the pixel transistors during a predetermined period to scanning lines extending in parallel to each other, first coordinate detection lines which extend to be perpendicular to the scanning lines and correspond to the scanning lines different from each other, second coordinate detection lines which extend in parallel to the scanning lines and correspond to the scanning lines different from each other, first coordinate detection transistors which electrically connect the first coordinate detection lines corresponding to the scanning lines to a first output line commonly connected with the first coordinate detection transistors based on the ON signals supplied to the pixel transistors from the scanning lines, and second coordinate detection transistors which electrically connect the second coordinate detection lines corresponding to the scanning lines to a second output line commonly connected with the second coordinate detection transistors based on the ON signals supplied to the pixel transistors from the scanning lines. The pixel transistors, the first coordinate detection lines, the second coordinate detection lines, the first coordinate detection transistors, the second coordinate detection transistors, the first output line, and the second output line are formed on the same substrate.

A liquid crystal display panel according to another aspect of the present invention includes a liquid crystal display panel in which a liquid crystal layer is formed between a first substrate having pixel transistors and pixel electrodes and a second substrate having an opposed electrode and protruding contact portions formed on the second substrate come into contact with coordinate detection electrodes formed on the first substrate when the liquid crystal display panel is pressed, a coordinate detection circuit which acquires contact information between the protruding contact portions and the coordinate detection electrodes, and a scan driver which outputs ON signals for turning on the pixel transistors during a predetermined period to the pixel transistors through scanning lines formed on the first substrate. In the liquid crystal display panel, coordinate detection lines corresponding to scanning lines different from each other and corresponding to the coordinate detection electrodes different from each other and coordinate detection transistors which electrically connect the coordinate detection lines corresponding to the scanning lines to an output line commonly connected with the coordinate detection transistors based on the ON signals output to the scanning lines from the scan driver being formed on the first substrate.

A liquid crystal display panel according to another aspect of the present invention includes a liquid crystal display panel in which coordinate detection electrodes are formed on a first substrate and protruding contact portions are formed on a second substrate as a touch panel function, and a coordinate detection circuit which detects a coordinate position at which the liquid crystal display panel is pressed. The liquid crystal display panel includes a conversion circuit which subjects information indicative of whether the protruding contact portions are in contact with the coordinate detection electrodes to parallel/serial conversion to output the converted information to the coordinate detection circuit.

According to the present invention, though a liquid crystal display panel performs the touch panel function, the number of connection terminals of the liquid crystal display panel and the coordinate detection circuit are reduced to be smaller than the number of detectable coordinate points.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

[First Embodiment]

Figure 1:
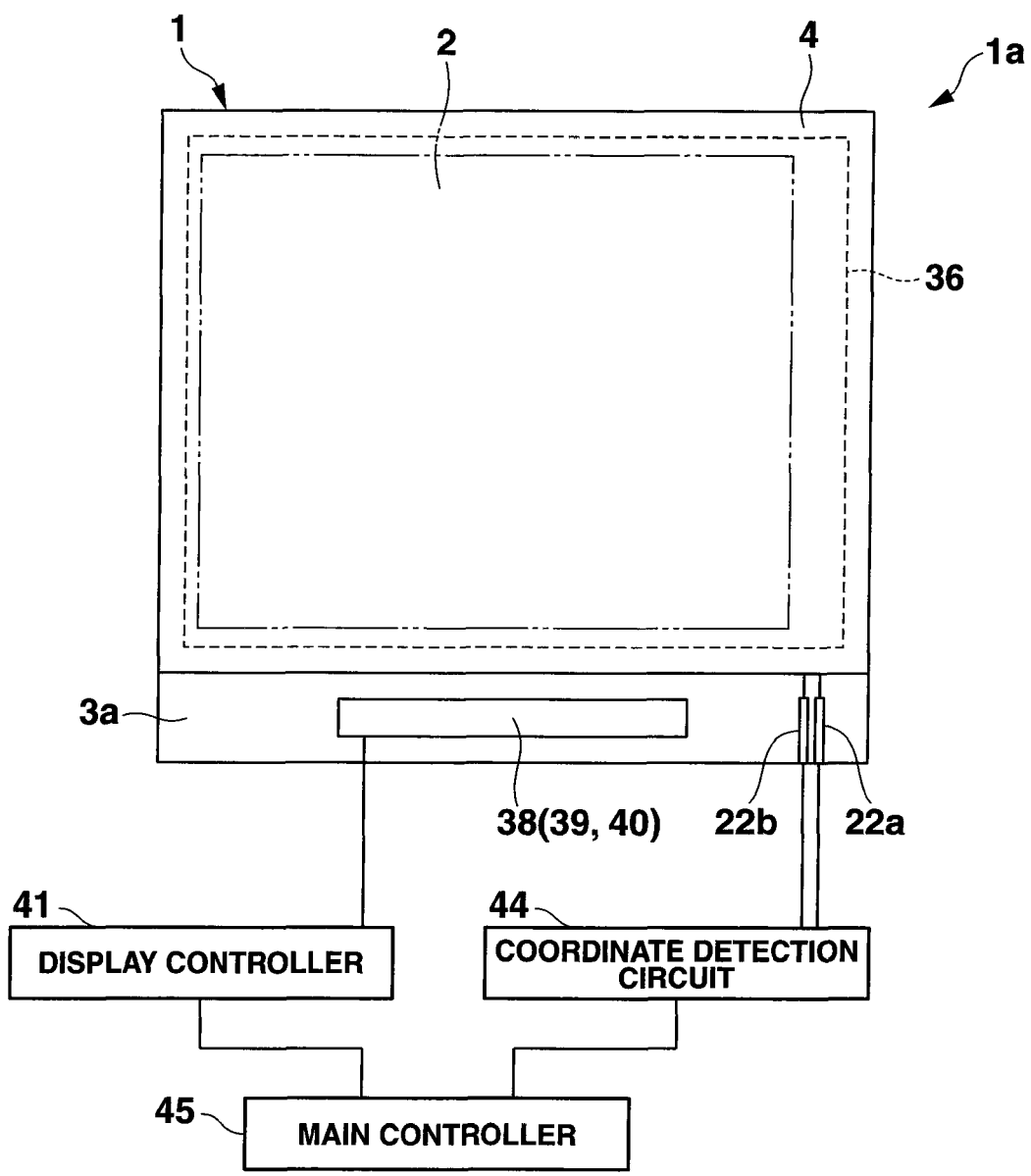
FIG. 1 is a plan view of a liquid crystal display apparatus according to a first embodiment of the present invention.

As shown in FIG. 1, a liquid crystal display apparatus 1a according to the present invention includes a liquid crystal display panel 1 having a touch panel function, a driver element 38 mounted on the liquid crystal display panel 1, a display controller 41, a coordinate detection circuit 44 and a main controller 45.

The liquid crystal display panel 1 is arranged so that pixel electrodes connected with pixel transistors face an opposed electrode through a liquid crystal layer per each pixel in a matrix arrangement, and it is configured so that an alignment direction of liquid crystal molecules in the liquid crystal layer changes when a voltage between the pixel electrodes and the opposed electrode is controlled.

Specifically, the liquid crystal display panel 1 is an active matrix liquid crystal display panel using thin-film transistors as active elements which are pixel transistors. As shown in FIGS. 1 to 9, on a surface facing a second transparent substrate 4 that is a front surface side of a first transparent substrate (which will be referred to as a rear substrate hereinafter) 3 in the first substrate 3 and the second substrate 4 which face each other through a liquid crystal layer 37 are provided: transparent pixel electrodes 5 which are arranged in a row direction and a column direction in a predetermined pixel area 2; display thin-film transistors (which will be referred to as display TFTs hereinafter) 6 which are arranged corresponding to the respective pixel electrodes 5 and connected with the corresponding pixel electrodes 5, respectively; scanning lines 14 which are formed along the respective pixel electrode rows in accordance with the respective rows of the pixel electrodes 5 and supply gate signals to the display TFTs 6 in the respective rows; and signal lines 15 which are formed along the respective pixel electrode columns in accordance with the respective columns of the pixel electrodes 5 and supply data signals to the display TFTs 6 in the respective columns. On a surface of the second substrate (which will be referred to as a front substrate hereinafter) 4 facing the rear substrate 3 are provided: one film-like transparent opposed electrode 16 that faces the pixel electrodes 5; light shielding films 17 corresponding to regions between the pixels constituted of regions where the pixel electrodes 5 face the opposed electrode 16; and three color filters 18R, 18G and 18B of red, green and blue formed corresponding to the respective pixels. Here, more specifically, the scanning lines 14, which extend in parallel to each other, are to supply ON signals for turning on the respective corresponding display TFTs 6 during a predetermined period to the display TFTs 6 from a scan driver 39 as gate signals.

Further, this liquid crystal display panel 1 includes a touch panel function, and this touch panel function is configured as follows. That is, X coordinate detection lines 19 which are utilized to detect a first coordinate of a touch point, e.g., an X coordinate in a direction of the scanning lines 14, Y coordinate detection lines 20 which are utilized to detect a second coordinate of the touch point, e.g., a Y coordinate in a direction of the signal lines 15, X coordinate detection electrodes 25 arranged to be connected with the respective X coordinate detection lines, and Y coordinate detection electrodes 26 arranged to be connected with the respective Y coordinate detection lines are provided on the surface of the rear substrate 3 facing the front substrate 4, protruding contact portions 31 which come into contact with both the X coordinate detection electrodes 25 and the Y coordinate detection electrodes 26 by flexural deformation of the front substrate 4 due to touch from an outer surface side of the front substrate 4 are formed at portions of the opposed electrode 16 provided on the front substrate 4 facing the respective arrangement portions of the X coordinate detection electrodes 25 and the Y coordinate detection electrodes 26.

The X coordinate detection lines 19 correspond to different columns of the pixels in the matrix arrangement. That is, each X coordinate detection line 19 is provided every predetermined number of columns in the columns of the pixel electrodes 5, e.g., three pixel electrode columns. The Y coordinate detection lines 20 correspond to different lines of the pixels in the matrix arrangement. That is, each Y coordinate detection line 20 is provided in each of all the rows of the pixel electrodes 5.

Here, the X coordinate detection electrodes 25 are arranged so as to form lines along the respective X coordinate detection lines 19, and they are also arranged so as to form lines along the respective Y coordinate detection lines 20. Further, each of the X coordinate detection electrodes 25 is connected with the nearest X coordinate detection line 19 that is adjacent to this X coordinate detection electrode 25. That is, the X coordinate detection electrodes 25 arranged along the Y coordinate detection lines 20 correspond to the columns of the pixels in the matrix arrangement, respectively. Furthermore, although the detail will be described later, each of the X coordinate detection lines 19 corresponds to different one of the scanning lines 14. That is, the X coordinate detection electrodes 25 arranged along the Y coordinate detection lines 20 are connected with the X coordinate detection lines 19 different from each other, respectively. Therefore, the X coordinate detection electrodes 25 arranged along the Y coordinate detection lines 20 correspond to the scanning lines 14 different from each other, respectively.

Moreover, the Y coordinate detection electrodes 26 are arranged so as to form lines along the Y coordinate detection lines 20, and they are also arranged so as to form lines along the X coordinate detection lines 19. Additionally, each of the Y coordinate detection electrodes 26 is connected with the nearest Y coordinate detection line 20 adjacent to this Y coordinate detection electrode 26. That is, the Y coordinate detection electrodes 26 arranged along the X coordinate detection lines 19 correspond to the lines of the pixels in the matrix arrangement, respectively. Further, although the detail will be described later, each of the Y coordinate detection lines 20 corresponds to different one of the scanning lines 14. That is, the Y coordinate detection electrodes 26 arranged along the X coordinate detection lines 19 are connected with the Y coordinate detection lines 20 different from each other, respectively. Therefore, the Y coordinate detection electrodes 26 arranged along the X coordinate detection lines 19 correspond to the scanning lines 14 different from each other, respectively.

Additionally, although the detail will be described later, the X coordinate detection electrodes 25 and the Y coordinate detection electrodes 26 are provided to be equal in number, and one X coordinate detection electrode 25 and one Y coordinate detection electrode 26 form one set of coordinate detection points. Further, the X coordinate detection electrode 25 and the Y coordinate detection electrode 26 constituting one set of coordinate detection points are arranged to be adjacent to each other, and they come into contact with the common contact portion 31 when the front substrate 4 undergoes flexural deformation.

Furthermore, each X coordinate detection line 19 is arranged to be orthogonal to each Y coordinate detection line 20.

It is to be noted that each pixel electrode 5 is formed into a vertically long rectangular shape in which an electrode width in the row direction is smaller than an electrode width in the column direction. Each display TFT 6 is arranged on one end edge (a lower end edge in FIG. 3) side of each pixel electrode 5 formed into the vertically long rectangular shape in the column direction. Each scanning line 14 is provided along an end edge of the pixel electrode 5 in each row on the side where the display TFT 6 is arranged. Each signal line 15 is provided along one side edge (a left side edge in FIG. 3) of the pixel electrode 5 in each column in the row direction.

Moreover, each light shielding film 17 is formed of a laminated film including, e.g., chrome and a chrome oxide, the three color filters 18R, 18G and 18B of red, green and blue are formed into a stripe shape on the surface of the front substrate 4 where the light shielding films 17 are formed corresponding to the respective pixel electrode columns, and the opposed electrode 16 is formed on these color filters 18R, 18G and 18B.

The liquid crystal display panel 1 according to this embodiment is to detect a touch point coordinate in the direction of the scanning lines 14 as an X coordinate and to detect a touch point coordinate in the direction of the signal lines 15 as a Y coordinate. Each X coordinate detection line 19 is formed between the pixel electrodes 5 in the central column in respective columns of the pixels in the matrix arrangement and the signal line 15 adjacent to this column of the pixel electrodes 5 to be substantially parallel to the signal line 15. Each Y coordinate detection line 20 is formed between the pixel electrodes 5 in each row of the pixels in the matrix arrangement and the scanning line 14 adjacent to this row of the pixel electrodes 5 to be substantially parallel to the scanning line 14. Each contact portion 31 is formed to be electrically conductive with respect to the opposed electrode 16.

It is to be noted that each X coordinate detection line 19 is formed between the pixel electrodes 5 in the central column in the respective columns of the pixels and the signal line 15 through which data signals are supplied to the display TFTs 6 connected with the respective pixel electrodes 5 in the end column on the opposite side in the pixel column adjacent to the former pixel column. Each Y coordinate detection line 20 is provided between the pixel electrodes 5 in each row of the pixels and the scanning line 14 through which gate signals are supplied to the display TFTs 6 connected with the respective pixel electrodes 5 in a pixel row adjacent to the former pixel row.

Further, each X coordinate detection line 19 is insulated from each Y coordinate detection line 20. On one or both of each X coordinate detection line 19 and each Y coordinate detection line 20 of an insulating film (a later-described overcoat film 23 or a two-layer film including a gate insulating film 8 of the display TFT 6 and the overcoat insulating film 23 in this embodiment) provided to cover each X coordinate detection line 19 and each Y coordinate detection line 20, the X coordinate detection electrode 25 to detect a touch point coordinate in the X direction and the Y coordinate detection electrode 26 to detect a touch point coordinate in the Y direction are arranged so that the X coordinate detection electrode 25 is connected with the X coordinate detection line 19 in a first contact hole 29 provided in the insulating film and the Y coordinate detection electrode 26 is connected with the Y coordinate detection line 20 in a second contact hole 30 provided in the insulating film.

Furthermore, the X coordinate detection electrode 25 and the Y coordinate detection electrode 26 are arranged to be adjacent to each other near each line intersecting portion where each X coordinate detection line 19 crosses each Y coordinate detection line 20. Each contact portion 31 is formed into a shape that it comes into contact with both the X coordinate detection electrode 25 and the Y coordinate detection electrode 26 adjacent to each other to face each arrangement portion of the X coordinate detection electrode 25 and the Y coordinate detection electrode 26 adjacent to each other.

Moreover, this liquid crystal display panel 1 includes X coordinate detection thin-film transistors (which will be referred to as X coordinate detection TFTs hereinafter) 6a and Y coordinate detection thin-film transistors (which will be referred to as Y coordinate detection TFTs hereinafter) 6b arranged in a region other than the screen area 2 of the rear substrate 3. Each X coordinate detection TFT 6a and each Y coordinate detection TFT 6b are arranged in a region (a region on a right-hand side of the screen area 2 in FIG. 1) other than the screen area of each scanning line and each Y coordinate detection line on one end side.

Each of the X coordinate detection TFT 6a and the Y coordinate detection TFT 6b has a laminated structure equal to that of the display TFT 6. That is, each of the display TFT 6, the X coordinate detection TFT 6a and the Y coordinate detection TFT 6b includes a gate electrode 7 formed on the rear substrate 3, a transparent gate insulating film 8 formed to cover the gate electrode 7, an i-type semiconductor film 9 formed to face the gate electrode 7 on the gate insulating film 8, a blocking insulating film 10 formed on a channel region of the i-type semiconductor film 9, and a source electrode 12 and a drain electrode 13 formed on both side portions sandwiching the channel region of the i-type semiconductor film 9 through an n-type semiconductor film 11.

Furthermore, each scanning line 14 and each Y coordinate detection line 20 are formed of the same metal film as the gate electrode 7 of each TFT 6, 6a or 6b for display, X coordinate detection and Y coordinate detection on the rear substrate 3. The gate insulating film 8 of each TFT 6, 6a or 6b is formed on substantially the entire rear substrate 3 to cover each scanning line 14 and each Y coordinate detection line 20. Each signal line 15 and each X coordinate detection line 19 is formed of the same metal film as the source electrode 12 and the drain electrode 13 of each TFT 6, 6a or 6b on the gate insulating film 8.

That is, each Y coordinate detection line 20 is formed on the rear substrate 3, and each X coordinate detection line 19 is formed to be insulated from each Y coordinate detection line 20 by the gate insulating film 8 that is provided to cover each Y coordinate detection line 20.

Moreover, an overcoat insulating film 23 is provided on the gate insulating film 8 to cover each TFT 6, 6a or 6b, each signal line 15 and each X coordinate detection line 19. Each pixel electrode 5 is formed on the overcoat insulating film 23 so that one end portion of each pixel electrode 5 faces the drain electrode 13 of each display TFT 6, and connected with the drain electrode 13 of the display TFT 6 in a contact hole 24 provided in the overcoat insulating film 23.

Although not shown in the drawing, on the rear substrate 3, a capacitance electrode that faces a peripheral portion of each pixel electrode 5 except a connecting portion with respect to the display TFT 6 through the gate insulating film 8 and the overcoat insulating film 23 and forms a compensation capacitance between itself and the peripheral portion of each pixel electrode 5 is formed of the same metal film as the gate electrode 7, each scanning line 14 and each Y coordinate detection line 20.

Additionally, the X coordinate detection electrode 25 and the Y coordinate detection electrode 26 are formed on the overcoat insulating film 23 provided to cover each X coordinate detection line 19.

In this embodiment, each of the X coordinate detection electrode 25 and the Y coordinate detection electrode 26 is formed at a portion that covers the Y coordinate detection line near each line intersecting portion where each X coordinate detection line 19 crosses each Y coordinate detection line 20 so that an end portion of the X coordinate detection electrode 25 on the opposite side of the side neighboring the Y coordinate detection electrode 26.

It is to be noted that the X coordinate detection electrode 25 and the Y coordinate detection electrode 26 are provided in a portion adjacent to each pixel electrode 5 facing the blue filter 18B on the Y coordinate detection line 20.

Further, in this embodiment, a basal portion 27 formed into the same laminated structure as the respective TFTs 6, 6a and 6b for display, X coordinate detection and Y coordinate detection and the overcoat insulating film 23 provided thereon is formed on the rear substrate 3 corresponding to a region where each contact potion 31 of the X coordinate detection electrode 25 and the Y coordinate detection electrode 26 provided on the front substrate 4 comes into contact, and the X coordinate detection electrode 25 and the Y coordinate detection electrode 26 are formed on this basal portion 27.

The basal portion 27 is formed into the same laminated structure as the laminated structure including the overcoat insulating film 23 of each TFT 6, 6a or 6b for display, X coordinate detection or Y coordinate detection. That is, the basal portion 27 is formed of the Y coordinate detection line 20, the gate insulating film 8 provided to cover the Y coordinate detection line 20, the same three-layer film as the i-type semiconductor film 9, the blocking insulating film 10 and the n-type semiconductor film 11 of each TFT 6, 6a or 6b, an upper metal film 28 formed of the same metal film as the source electrode 12 and the drain electrode 13, and the overcoat insulating film 23.

Furthermore, each of the X coordinate detection electrode 25 and the Y coordinate detection electrode 26 is formed on the basal portion 27, i.e., a portion that covers the Y coordinate detection line 20 on the overcoat insulating film 23 so that the end portion of the X coordinate detection electrode 25 on the opposite side of the side adjacent to the Y coordinate detection electrode 26 faces the line intersecting portion. In the contact electrodes 25 and 26, the end portion of the X coordinate detection electrode 25 on the opposite side is connected with the X coordinate detection line 19 in the first contact hole 29 provided in the overcoat insulating film 23. The end portion of the Y coordinate detection electrode 26 on the opposite side of the side adjacent to the X coordinate detection electrode 25 is connected with the Y coordinate detection line 20 in the second contact hole 30 provided in the overcoat insulating film 23 and the gate insulating film 8. It is to be noted that, in this embodiment, the basal portion 27 is formed at a portion facing the adjoining end portions of the X coordinate detection electrode 25 and the Y coordinate detection electrode 26, and hence a portion other than the adjoining end portions of the X coordinate detection electrode 25 and the Y coordinate detection electrode 26 is lower than the adjoining end portions.

The respective TFTs 6, 6a and 6b and the basal portion 27 are formed in a process of simultaneously forming the gate electrode 7 and the Y coordinate detection line 20 based on formation of a gate metal film on the rear substrate 3 and its patterning, sequentially forming the gate insulating film 8, the i-type semiconductor film 9 and the blocking insulating film 10, patterning the blocking insulating film 10, then sequentially forming the n-type semiconductor film 11 and the source and drain metal films, and collectively patterning the source and drain metal films, the n type semiconductor film 11 and the i-type semiconductor film 9 into shapes of the source electrode 12 and the drain electrode 13 of each TFT 6, 6a or 6b, the X coordinate detection line 19 and the upper metal film 28 of the basal portion 27. Therefore, the i-type semiconductor film 9 an the n-type semiconductor film 11 are also present below each signal line 15 and each X coordinate detection line 19. It is to be noted that the i-type semiconductor film 9 an the n-type semiconductor film 11 are formed of amorphous silicon or polysilicon.

Moreover, each X coordinate detection line 19 is provided in accordance with each of predetermined pixel electrode columns, and each Y coordinate detection line 20 is provided in accordance with each of predetermined pixel electrode rows. It is to be noted that, in the liquid crystal display panel 1 according to this embodiment, the number of the pixel electrode rows is larger than the number of the pixel electrode columns. In this embodiment, each Y coordinate detection line 20 is provided in accordance with each of all the rows of the pixel electrodes 5, and the X coordinate detection lines 19 equal to the Y coordinate detection lines in number are provided every predetermined number, e.g., every three pixel electrode columns (per each pixel electrode facing the blue filter 18B in three colors, i.e., red, green and blue in FIGS. 2 and 3) in the columns of the pixel electrodes 5.

Additionally, the X coordinate detection TFT 6a and the Y coordinate detection TFT 6b are arranged in a region other than the screen area of the rear substrate 3 for each of the scanning lines (all the scanning lines in this embodiment) 14 equal to the Y coordinate detection lines 20 in number so that one X coordinate detection TFT 6a and one Y coordinate detection TFT 6b correspond to one scanning line 14.

It is to be noted that, in this embodiment, the respective Y coordinate detection TFTs 6b are aligned in a line in a row direction (a direction parallel to the X coordinate detection lines 19) at substantially the same intervals as the intervals of the respective Y coordinate detection lines 20 on the side of the region outside the screen area that is adjacent to the screen area 2. The respective X coordinate detection TFTs 6a are aligned in a line in the row direction outside the respective Y coordinate detection TFTs 6b to be adjacent to the respective Y coordinate detection TFTs 6b.

Further, each scanning line 14 is connected with the gate electrodes 7 of both one X coordinate detection TFT 6a and one Y coordinate detection TFT 6b corresponding to this scanning line 14, each X coordinate detection line 19 is connected with the source electrode 12 of each X coordinate detection TFT 6a, and each Y coordinate detection line 20 is connected with the source electrode 12 of each Y coordinate detection TFT 6b.

Furthermore, each X coordinate detection TFT 6a and each Y coordinate detection TFT 6b are arranged near a position where each Y coordinate detection line 20 is extended to the region outside the screen area. Each Y coordinate detection line 20 is extended to be connected with the source electrode 12 of each Y coordinate detection TFT 6b. Each scanning line 14 is connected with the gate electrodes 7 of each X coordinate detection TFT 6a and each Y coordinate detection TFT 6b through extension wires 14a extended from the scanning lines 14 in the column direction. Each X coordinate detection line 19 is connected with the source electrode 12 of each X coordinate detection TFT 6a through an extension line 19a drawn and extended on the outer side of the screen area 2 from each of these X coordinate detection lines 19.

Moreover, in the region outside the screen area of the rear substrate 3, one X coordinate detection output line 21a corresponding to each X coordinate detection TFT 6a and one Y coordinate detection output line 21b corresponding to each Y coordinate detection TFT 6b are formed along the column direction.

Additionally, the drain electrode 13 of each X coordinate detection TFT 6a is connected with one X coordinate detection output line 21a, and the drain electrode 13 of each Y coordinate detection TFT 6b is connected with one Y coordinate detection output line 21b.

That is, the respective X coordinate detection TFTs 6a share one X coordinate detection output line 21a. Therefore, the respective X coordinate detection lines 19 also share one X coordinate detection output line 21a. Further, the respective X coordinate detection electrodes 25 share one X coordinate detection output line 21a.

Furthermore, the respective Y coordinate detection TFTs 6b share one Y coordinate detection output line 21b. Therefore, the respective Y coordinate detection lines 20 also share one Y coordinate detection output line 21b. Moreover, the respective Y coordinate detection electrodes 26 share one Y coordinate detection output line 21b.

Each of the X coordinate detection output line 21a and the Y coordinate detection output line 21b is formed of the same metal film as the source electrode 12 and the drain electrode 13 of the respective TFTs 6, 6a and 6b for display, X coordinate detection and Y coordinate detection on the gate insulating film 8. One end of each of the output lines 21a and 21b is drawn out to a driver mount portion 3a (see FIG. 1) formed by protruding one end portion of the rear substrate 3 toward the outside of the front substrate 4, and it is connected to each of external circuit connection terminals 22a and 22b provided on the driver mount portion 3a.

Additionally, each X coordinate detection electrode 25 and each Y coordinate detection electrode 26 are arranged to be adjacent to each other near each line intersecting portion at which each X coordinate detection line 19 crosses each Y coordinate detection line 20.

On the other hand, each contact portion 31 provided on the inner surface of the front substrate is formed into a shape that comes into contact with both the X coordinate detection electrode 25 and the Y coordinate detection electrode 26 which are adjacent to each other to face each arrangement portion of the X coordinate detection electrode 25 and the Y coordinate detection electrode 26 that are adjacent to each other.

Each contact portion 31 is formed so that the portion of the opposed electrode 16 which faces each of the X coordinate detection electrode 25 and the Y coordinate detection electrode 26 faces each of the X coordinate detection electrode 25 and the Y coordinate detection electrode 26 to interpose a gap therebetween, and it is formed to protrude with a height that achieves contact with each of the X coordinate detection electrode 25 and the Y coordinate detection electrode 26 by flexural deformation in the inner surface direction due to touch from the outer surface side of the front substrate 4.

In this embodiment, a convex portion 32 having a shape facing both the X coordinate detection electrode 25 and the Y coordinate detection electrode 26 is formed of a photosensitive resin or the like on the light shielding film 17, and the opposed electrode 16 is formed thereon, thereby forming a portion of the opposed electrode 16 on the convex portion 32 as the contact portion 31.

Additionally, columnar spacers 33 (see FIG. 6) that define a gap between the rear substrate 3 and the front substrate 4 are dotted and arranged at positions different from those of the contact portions 31 on the surface of the front substrate 4 facing the rear substrate 3.

The respective columnar spacers 33 are formed of an insulating material such as a photosensitive resin on the opposed electrode 16, and they are provided to face every several display TFTs 6 in the respective display TFTs 6 arranged in the row direction and the column direction.

It is to be noted that the color filters 18R, 18G and 18B are formed to exclude positions where each convex portion 32 forming the contact portion 31 and each columnar spacer 33 are formed, the convex portion 32 is formed to be higher than a film thickness of each of the color filters 18R, 18G and 18G, and the columnar spacer 33 is formed to be higher than the convex portion 32.

Further, the light shielding films 17 provided on the front substrate 4 are formed in regions between pixels of the screen area 2 and the entire region outside the screen area where each X coordinate detection TFT 6a and each Y coordinate detection TFT 6b are arranged. The color filters 18R, 18G and 18B are provided corresponding to the screen area 2. The opposed electrode 16 is formed over the screen area 2 and the entire region outside the screen area.

Furthermore, alignment films 34 and 35 are formed on the rear substrate 3 and the front substrate 4 to cover the respective pixel electrodes, the respective X coordinate detection and Y coordinate detection TFTs 6a and 6b, the opposed electrode 16, the respective contact portions 31 and the respective columnar spacers 33.

It is to be noted that, although the opposed electrode 16 and the alignment films 34 and 35 are formed over the screen area 2 and the region outside the screen area in this embodiment, but the opposed electrode 16 and the alignment films 34 and 35 may be formed in the screen area 2 alone.

The rear substrate 3 and the front substrate 4 are oppositely arranged to define the gap between the substrates 3 and 4 so that each contact portion 31 faces the X coordinate detection electrode 25 and the Y coordinate detection electrode 26 to interpose an appropriate gap, and they are bonded through a frame-like sealing material 36 (see FIG. 1) that surrounds the screen area 2 and the region outside the screen area.

Moreover, a liquid crystal layer 37 is put in a region surrounded by the sealing material 36 in the gap between the substrates 3 and 4, and a polarizing plate (not shown) is arranged on the outer surface of each of the rear substrate 3 and the front substrate 4.

It is to be noted that this liquid crystal display panel 1 may be any one of a TN or STN type panel in which liquid crystal molecules of the liquid crystal layer 37 are twist-oriented between the substrates 3 and 4, a homeotropic alignment type panel in which the liquid crystal molecules are aligned substantially vertically with respect to the surfaces of the substrates 3 and 4, a non-twisted homogeneous alignment type panel in which the liquid crystal molecules are aligned substantially horizontally with respect to the surfaces of the substrates 3 and 4 with molecular major axes being aligned in one direction, a bend alignment type panel in which the liquid crystal molecules are subjected to bent alignment, a ferromagnetic or antiferromagnetic liquid display panel and others, or it may be a polymer network type liquid crystal display panel.

Figure 2:
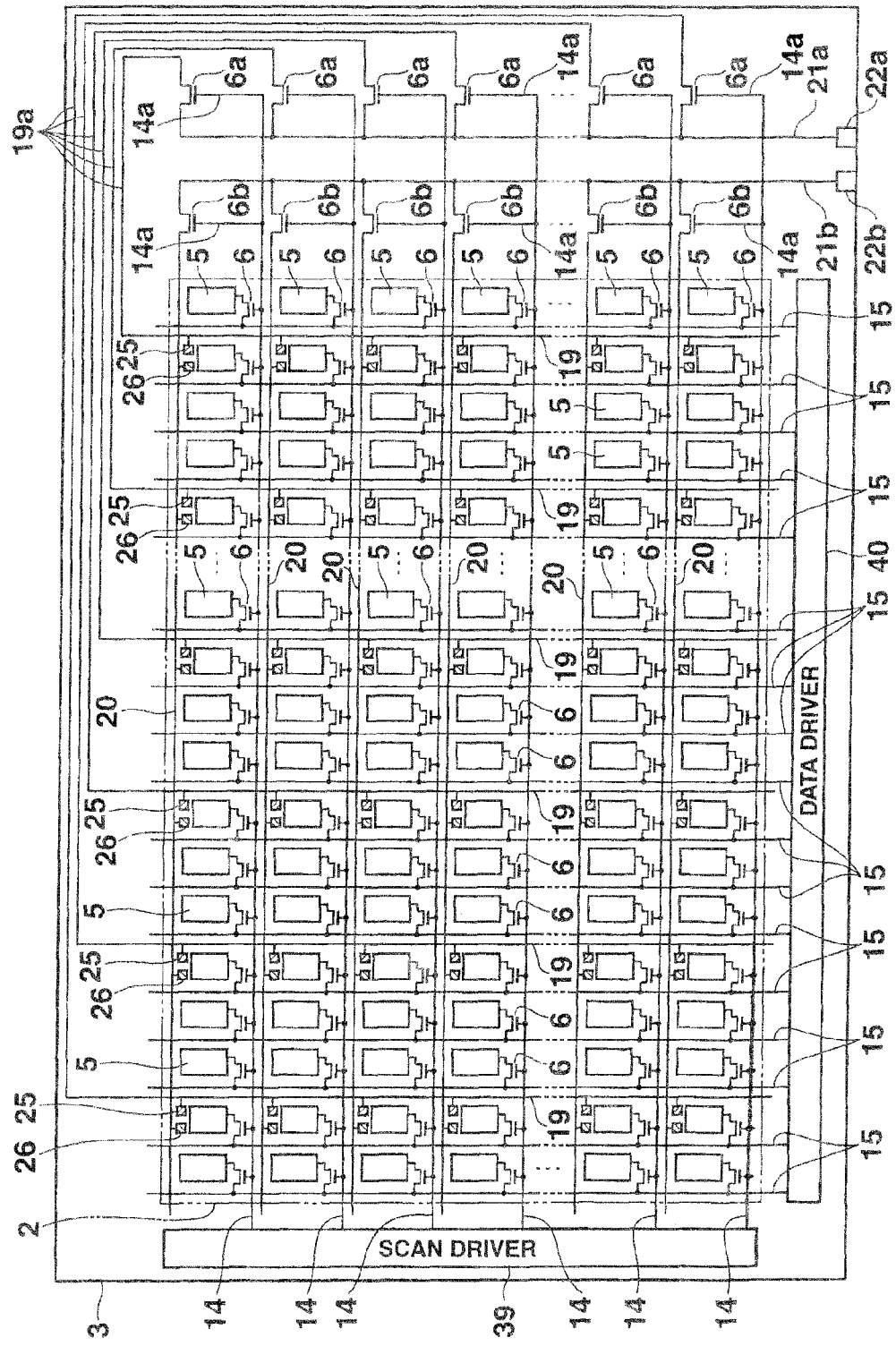
FIG. 2 is a circuit block diagram of a first substrate in the liquid crystal display apparatus according to the first embodiment.

Additionally, a driver element 38 including an LSI in which the scan driver 39 and the data driver 40 shown in FIG. 2 are formed is mounted on the driver mount portion 3a of the rear substrate 3. Each scanning line 14 and each signal line 15 are led out to the driver mount portion 3a (not shown) to be connected with respective output terminals of the scan driver 39 and the data driver 40.

Figure 3:
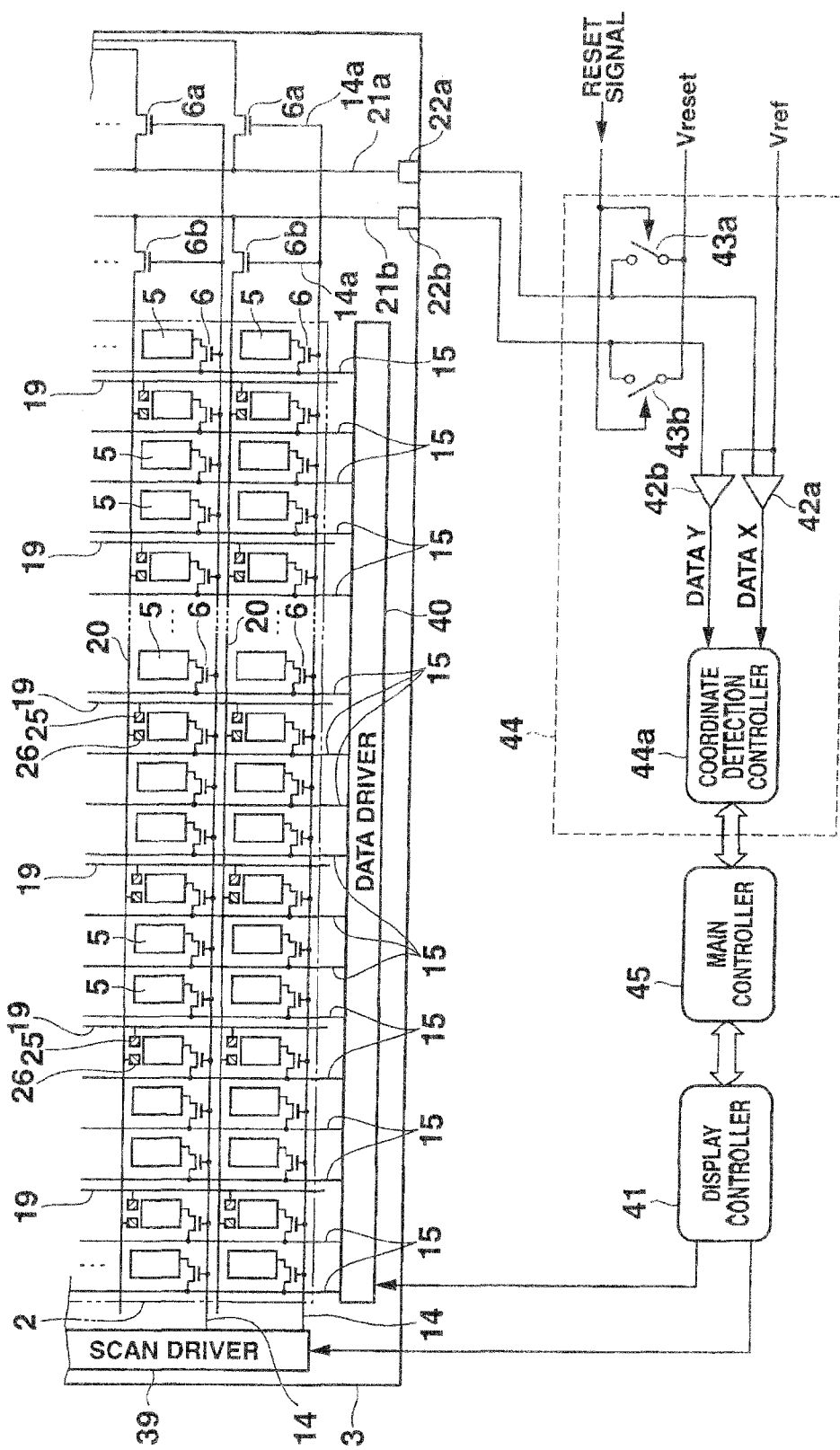
FIG. 3 is an external circuit diagram in the first embodiment.
Figure 4:
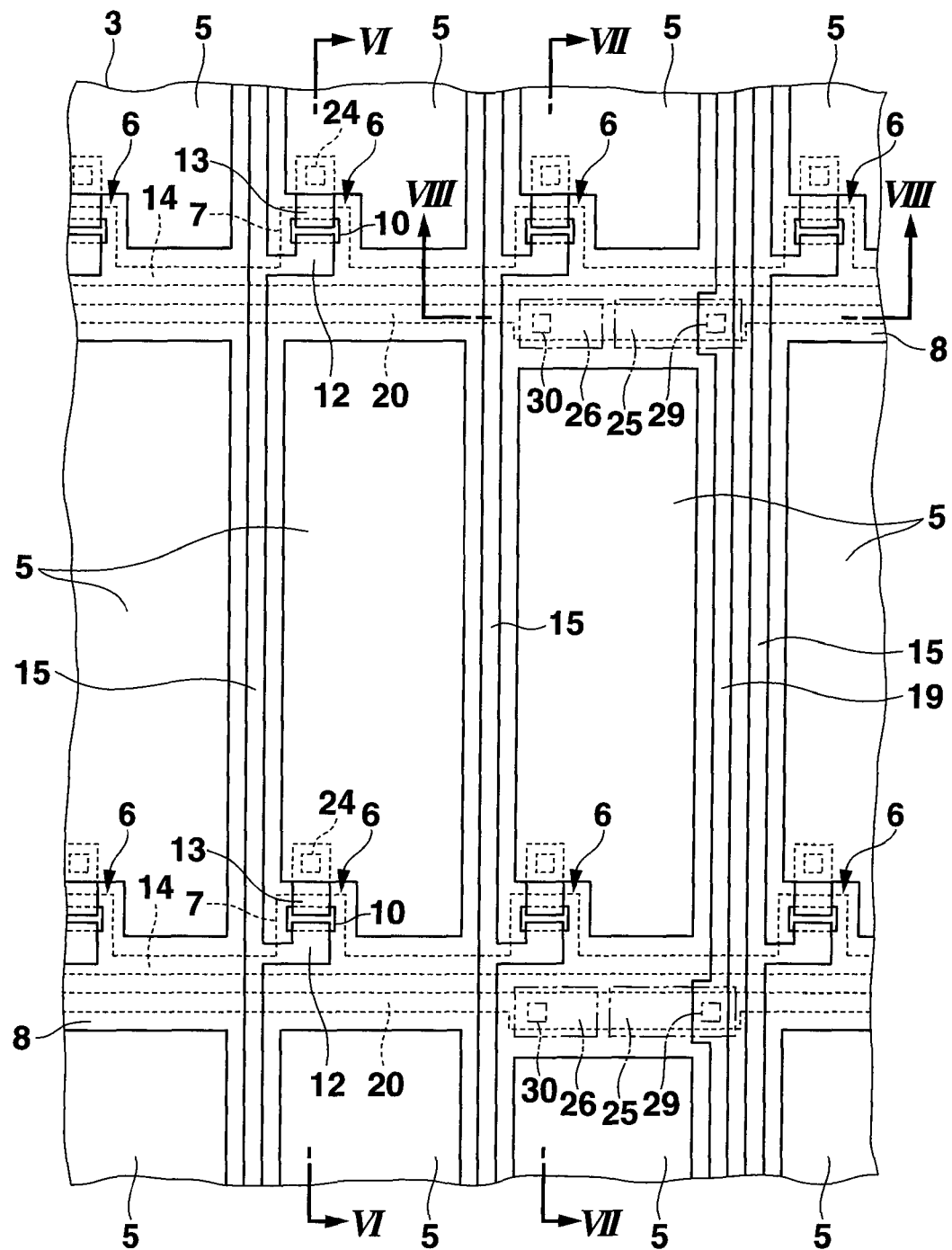
FIG. 4 is a partially enlarged plan view of a screen area of the first substrate in the first embodiment.
Figure 5:
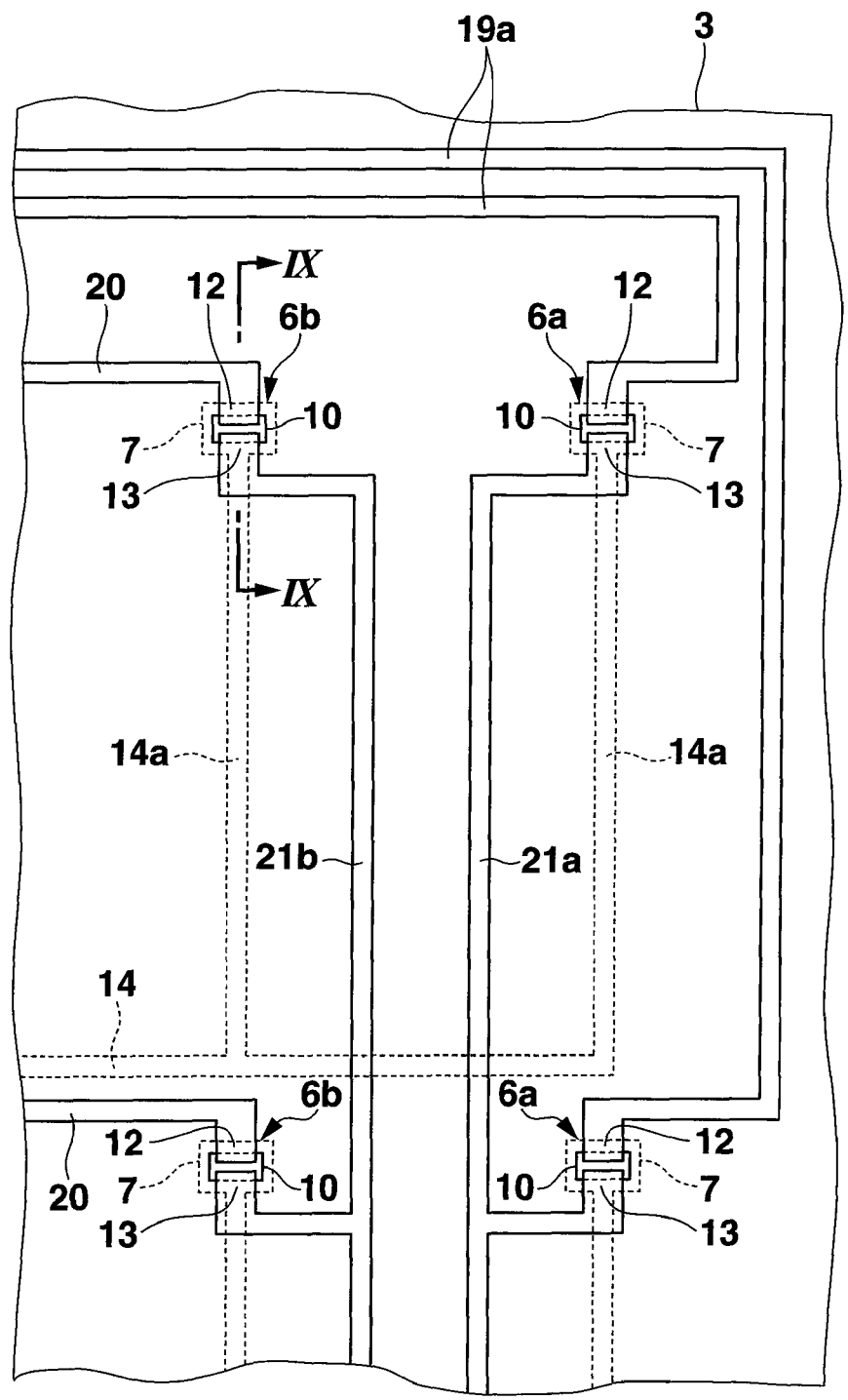
FIG. 5 is a partially enlarged plan view of X coordinate and Y coordinate detection thin-film transistor arrangement regions of the first substrate in the first embodiment.
Figure 6:
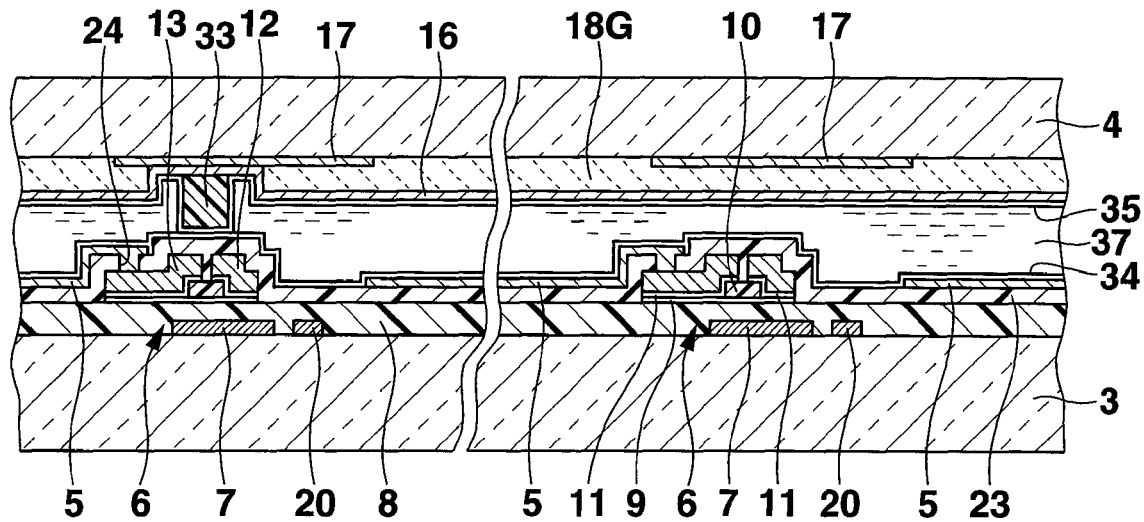
FIG. 6 is a cross-sectional view of the liquid crystal display apparatus in the first embodiment taken along a line VI-VI in FIG. 4.
Figure 7:
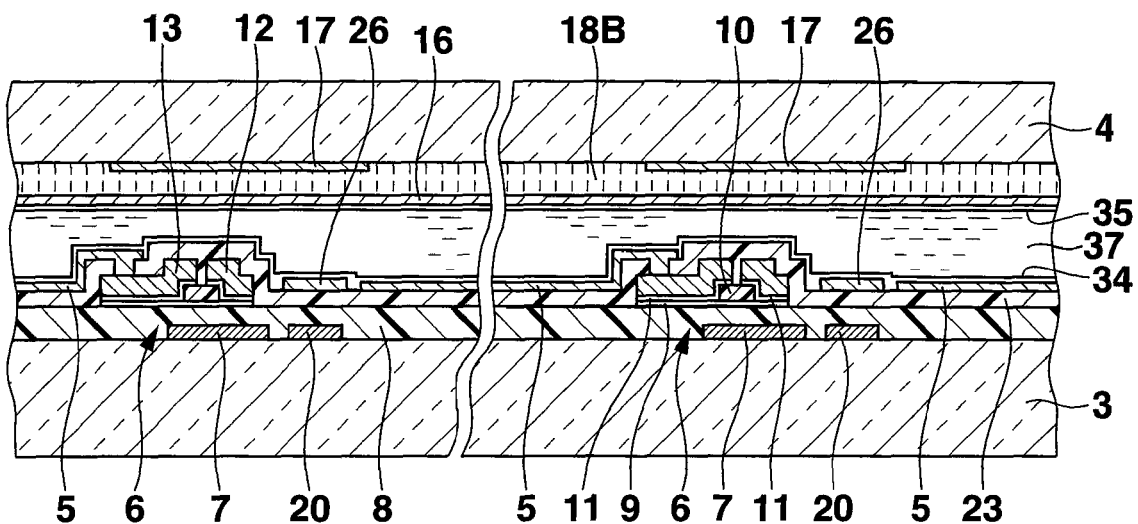
FIG. 7 is a cross-sectional view of the liquid crystal display apparatus in the first embodiment taken along a line VII-VII in FIG. 4.

On the other hand, as shown in FIGS. 1 and 3, external circuits connected with the liquid crystal display panel 1 include a display controller 41 that controls the scan driver 39 and the data driver 40 of the driver element 38, an X coordinate detection comparator 42a connected with an external circuit connection terminal 22a of the X coordinate detection output line 21a connected with the drain electrode 13 of each X coordinate detection TFT 6a, a Y coordinate detection comparator 42b connected with an external circuit connection terminal 22b of the Y coordinate detection output line 21b connected with the drain electrode 13 of each Y coordinate detection TFT 6b, a coordinate detection controller 44a that detects an X coordinate and a Y coordinate of a touch point based on data X output from the X coordinate detection comparator 42a and data Y output from the Y coordinate detection comparator 42b, and a main controller 45 that controls the display controller 41 and the coordinate detection controller 44a.

Here, in this embodiment, as shown in FIG. 3, the coordinate detection circuit 44 includes at least the X coordinate detection comparator 42a, the Y coordinate detection comparator 42b, the coordinate detection controller 44a, and later-described reset switches 43a and 43b.

It is to be noted that, although omitted in the drawing, an opposed electrode terminal formed on the driver mount portion 3a and a cross electrode that is formed at one or more corner portions of the substrate bonding portion provided by the frame-like sealing material 36 and is connected with the opposed electrode terminal are provided on the rear substrate 3 of the liquid crystal display panel 1. The opposed electrode 16 provided on the front substrate 4 is electrically connected with the cross electrode in the substrate bonding portion.

The liquid crystal display panel 1 is driven for display by applying a common signal to the opposed electrode 16 through the opposed electrode terminal from a non-illustrated common signal generation circuit, sequentially selecting the respective scanning lines 14 by using the scan driver 39 of the display controller 41, applying a gate signal that is utilized to turn on the display TFT 6 to the scanning line 14 selected in accordance with each selection period, and applying a data signal having a voltage difference corresponding to image data with respect to the common signal to each signal line 15 during the selection period of each scanning line 14 by a data driver 40 of the display controller 41.

Incidentally, as display driving scheme of the liquid crystal display panel 1, there are a frame reversal scheme for reversing a voltage of the common signal applied to the opposed electrode 16 to a high level (which will be referred to as an H level hereinafter) and a low level (which will be referred to as an L level hereinafter) in accordance with each frame required for displaying one screen and a line reversal scheme for reversing the voltage of the common signal to the H level and the L level in accordance with each selection period of each scanning line 14, and any driving scheme may be adopted.

Giving a description on an operation of the liquid crystal display panel 1 as a touch panel, touch input with respect to the liquid crystal display panel 1 is carried out by touching an arbitrary position in the screen area 2 from the outer surface side of the front substrate 4 during the display driving by using a fingertip or a touch pen.

When the touch input is carried out, a touched portion (which will be referred to as a touch portion hereinafter) of the front substrate 4 undergoes flexural deformation toward the inside, the contact portion 31 of the touch portion in the respective contact portions 31 formed on the opposed electrode 16 of the front substrate 4 comes into contact with the X coordinate detection electrode 25 and the Y coordinate detection electrode 26 which face this contact portion 31, and the opposed electrode 16, the X coordinate detection electrode 25 and the Y coordinate detection electrode 26 which have come into contact with the contact portion 31 are energized.

It is to be noted that the contact portion 31 comes into contact with the X coordinate detection electrode 25 and the Y coordinate detection electrode 26 through the alignment films 35 and 34 provided on the front substrate 4 and the rear substrate 3, but each of the alignment films 35 and 34 is a very thin film having a film thickness of approximately 0.02 μm. Therefore, a current flows between the contact portion 31, the X coordinate detection electrode 25 and the Y coordinate detection electrode 26 through these alignment films 35 and 34, and the opposed electrode 16 and the X coordinate detection electrode 25 and the Y coordinate detection electrode 26 that have come into contact with the contact portion 31 are energized.

Moreover, the X coordinate detection electrodes 25 are connected with each X coordinate detection line 19, and the Y coordinate detection electrodes 26 are connected with each Y coordinate detection line 20. Therefore, when the contact portion 31 comes into contact with any one of the X coordinate detection electrodes 25 connected with one X coordinate detection line 19, this X coordinate detection line 19 is charged with a voltage from the opposed electrode 16, and the voltage in the X coordinate detection line 19 becomes equal to a voltage of the common signal applied to the opposed electrode 16. Additionally, when the contact portion 31 comes into contact with any one of the Y coordinate detection electrodes 26 connected with one Y coordinate detection line 20, this Y coordinate detection line 20 is charged with a voltage from the opposed electrode 16, and the voltage in the Y coordinate detection line 20 becomes equal to the voltage of the common signal.

Further, since each scanning line 14 is connected with one X coordinate detection TFT 6a and one Y coordinate detection TFT 6b in the respective X coordinate detection TFTs 6a and the respective Y coordinate detection TFTs 6b, one X coordinate detection TFT 6a and one Y coordinate detection TFT 6b having the gate electrodes 7 connected with the scanning line 14 selected during the selection period for the respective scanning lines 14 are turned on.

Therefore, a signal corresponding to a charge voltage of the X coordinate detection line 19 connected with the source electrode 12 of the X coordinate detection TFT 6a that has been turned on based on application of the gate signal from the scanning line 14 selected during the selection period for the respective scanning lines 14 is output to the X coordinate detection output line 21a from the drain electrode 13 of the X coordinate detection TFT 6a. A signal corresponding to a charge voltage of the Y coordinate detection line 20 connected with the source electrode 12 of the Y coordinate detection TFT 6b that has been turned on based on application of the gate signal from the selected scanning line 14 is output to the Y coordinate detection output line 21b from the drain electrode 13 of the Y coordinate detection TFT 6b.

That is, in this liquid crystal display panel 1, parallel data of an X coordinate corresponding to the charge voltage for each X coordinate detection line 19 is converted into X coordinate serial data that turns to a charge voltage value of each X coordinate detection line 19 in accordance with the selection order of the respective scanning lines 14, an X coordinate serial data signal of this data is output from the X coordinate detection output line 21a, parallel data of a Y coordinate corresponding to the charge voltage for each Y coordinate detection line 20 is converted into Y coordinate serial data that turns to a charge voltage value of each Y coordinate detection line 20 in accordance with the selection order of the respective scanning lines 14, and a Y coordinate serial data signal of this data is output from the Y coordinate detection output line 21b.

The X coordinate serial data signal output from the X coordinate detection output line 21a is input to a data signal terminal of the X coordinate detection comparator 42a, and the Y coordinate serial data signal output from the Y coordinate detection output line 21b is input to a data signal terminal of the Y coordinate detection comparator 42b.

The X coordinate detection comparator 42a compares the voltage of the X coordinate serial data signal input to the data signal terminal during each selection period for the scanning lines 14 with a reference voltage Vref having a predetermined value lower than the common signal voltage from a non-illustrated reference signal generation unit. This comparator outputs a digital signal having a value 1 when the voltage of the X coordinate serial data signal is higher than the reference voltage Vref (at the time of the common signal voltage), and it outputs a digital signal having a value 0 when the voltage of the X coordinate serial data signal is lower than the reference voltage Vref.

Further, the Y coordinate detection comparator 42b compares a voltage of the Y coordinate serial data signal input to the data signal terminal thereof during each selection period of the scanning lines 14 with the reference voltage Vref from the reference signal generation unit. It outputs a digital signal having a value 1 when the voltage of the Y coordinate serial data signal is higher than the reference voltage Vref (at the time of the common signal voltage), and it outputs a digital signal having a value 0 when the voltage of the Y coordinate serial data signal is lower than the reference voltage Vref.

That is, each of data X output from the X coordinate detection comparator 42a and data Y output from the Y coordinate detection comparator 42b is digital data that has a value 1 or 0 during each selection period of the scanning lines 14.

Furthermore, the coordinate detection controller 44a detects an X coordinate and a Y coordinate of a touch point in the screen area 2 of the liquid crystal display panel 1 based on the data X output from the X coordinate detection comparator 42a and the data Y output from the Y coordinate detection comparator 42b, and outputs X coordinate data and Y coordinate data to the outside.

It is to be noted that, when the contact portion 31 does not come into contact with any one of the X coordinate detection electrodes 25 connected with one X coordinate detection line 19, this X coordinate detection line 19 is not charged with the voltage. When the contact portion 31 does not come into contact with any one of the Y coordinate detection electrodes 26 connected with one Y coordinate detection line 20, this Y coordinate detection line 20 is not charged with the voltage.

However, since each scanning line 14 is selected in accordance with each frame, in a previous frame, the contact portion 31 comes into contact with any one of the X coordinate detection electrodes 25 connected with the one X coordinate detection line 19 to charge the X coordinate detection line 19 with the voltage from the opposed electrode 16. A signal corresponding to a charge voltage of the previous frame (which will be referred to as a residual charge voltage hereinafter) is input to the source electrode 12 of the X coordinate detection TFT 6a from the X coordinate detection line 19 connected with the X coordinate detection electrodes 25 which do not come into contact with the contact portion 31, and an X coordinate serial data signal including an erroneous voltage corresponding to the residual charge voltage is output from the X coordinate detection output line 21a.

Likewise, in the previous frame, when the contact portion 31 comes into contact with any one of the Y coordinate detection electrodes 26 connected with the one Y coordinate detection line 20 to charge the Y coordinate detection line 20 with the voltage from the opposed electrode 16, a signal corresponding to the residual charge voltage is input to the source electrode 12 of the Y coordinate detection TFT 6b from the Y coordinate detection line 20 connected with the Y coordinate detection electrodes 25 which do not come into contact with the contact portion 31, and a Y coordinate serial data signal including an erroneous voltage corresponding to the residual charge voltage is output from the Y coordinate detection output line 21b.

Figure 11:
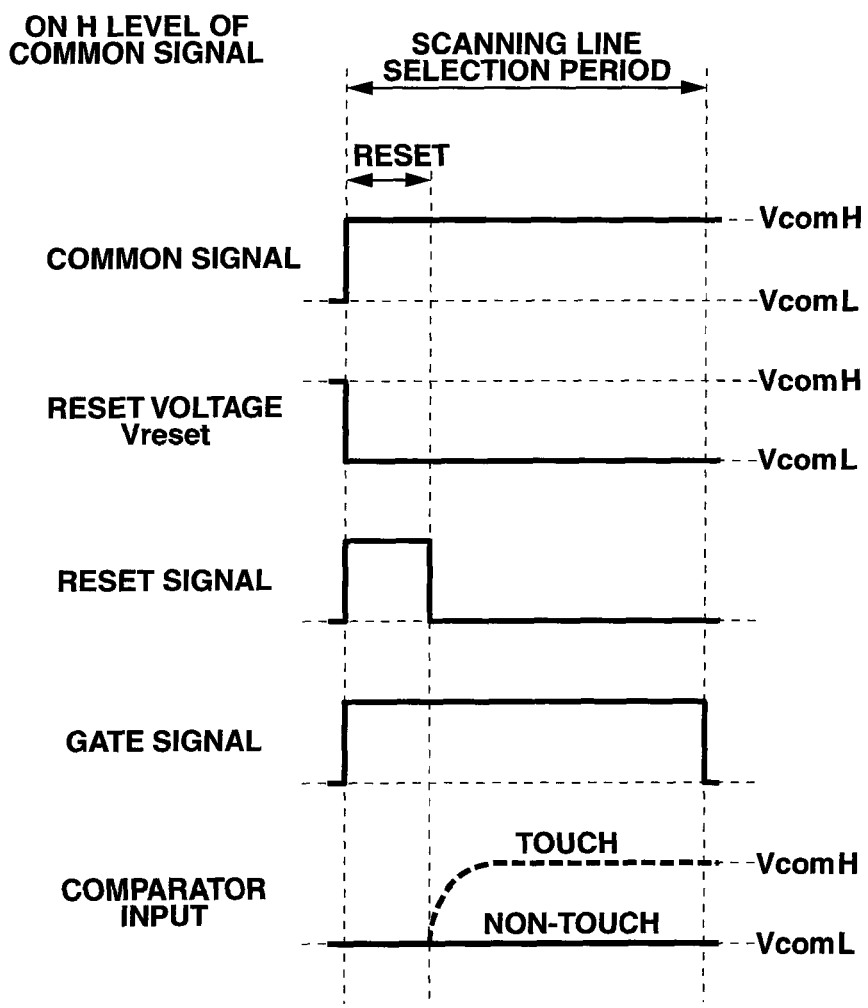
FIG. 11 is a comparator input sequence diagram when a high-level common signal is applied to an opposed electrode in a selection period of one scanning line in the liquid crystal display apparatus.
Figure 12:
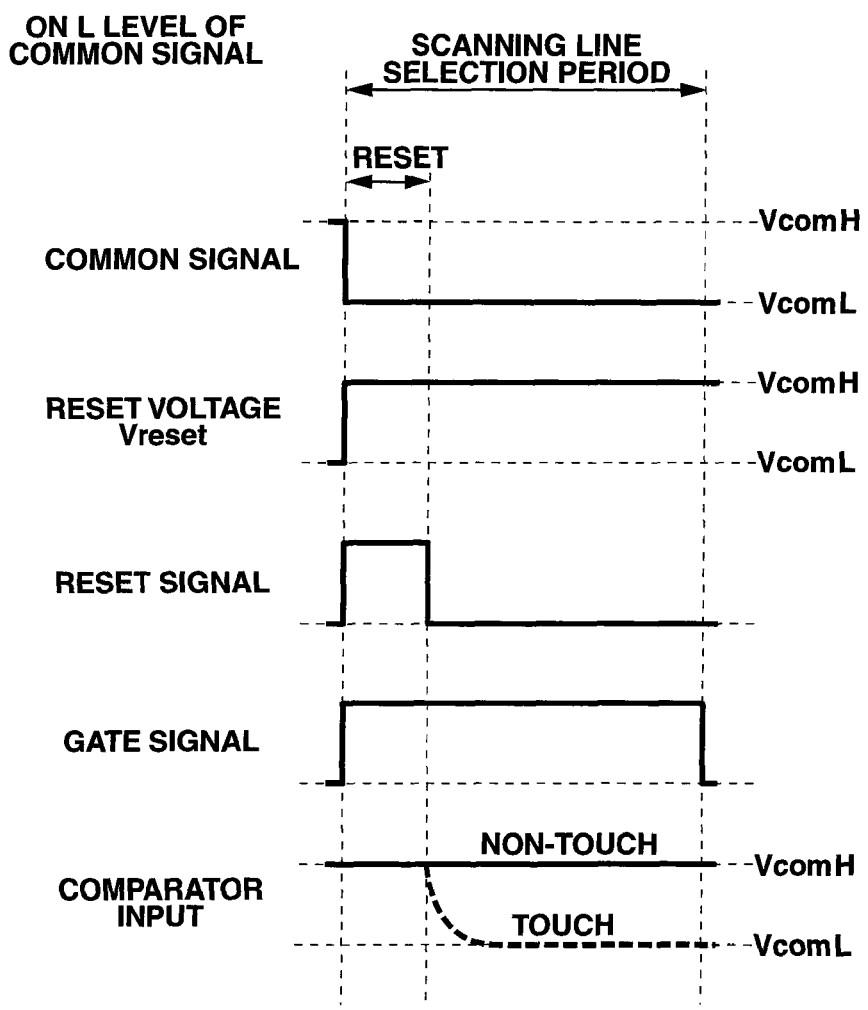
FIG. 12 is a comparator input sequence diagram when a low-level common signal is applied to the opposed electrode in the selection period of one scanning line in the liquid crystal display apparatus.

Therefore, in this embodiment, reset switches 43a and 43b which are utilized to connect a non-illustrated reset voltage generation unit are provided to a data signal input line for the X coordinate detection comparator 42a and a data signal input line for the Y coordinate detection comparator 42b. As shown in FIGS. 11 and 12, the first reset switch 43a and the second reset switch 43b are changed over to the connection side of the reset voltage generation unit based on a reset signal on an initial stage of the selection period for the respective scanning lines 14 to supply a reset voltage Vreset from the reset voltage generation unit to the data signal input line for the X coordinate detection comparator 42a and the data signal input line for the Y coordinate detection comparator 42b, thereby avoiding erroneous detection of a touch point coordinate due to input of the X coordinate serial data signal and the Y coordinate serial data signal including an erroneous voltage corresponding to the residual charge voltage to the X coordinate detection comparator 42a and the Y coordinate detection comparator 42b.

The reset voltage Vreset is a voltage having a waveform obtained by reversing a waveform of the common signal, i.e., a voltage opposite to the common signal voltage. In case of both performing display driving based on the frame reversal and performing display driving based on the line reversal, the X coordinate serial data signal and the Y coordinate serial data signal including the erroneous voltage corresponding to the residual charge voltage are canceled by supplying the reset voltage Vreset to the data signal input line for the X coordinate detection comparator 42a and the data signal input line for the Y coordinate detection comparator 42b on the initial stage of the selection period of the respective scanning lines 14, an X coordinate signal data signal and a Y coordinate serial data signal which are accurate at the present moment are input to the X coordinate detection comparator 42a and the Y coordinate detection comparator 42b, thereby increasing a detection accuracy of the coordinate detection controller 44a for the X coordinate and the Y coordinate of the touch point.

It is to be noted that Vcom H denotes a common signal voltage on the H level and Vcom L designates a common signal voltage on the L level in FIGS. 11 and 12. When the common signal on the H level is applied to the opposed electrode 16, the voltage Vcom L is provided at the time of non-touch that the contact portion 31 does not come into contact with any one of the X coordinate detection electrodes 25 connected with one X coordinate detection line 19 during each selection period for the respective scanning lines 14. At the time of touch that the contact portion 31 comes into contact with any one of the X coordinate detection electrodes 25 connected with the one X coordinate detection line 19, an X coordinate serial data signal that provides the voltage Vcom H after the reset is input to the X coordinate detection comparator 42a. At the time of non-touch that the contact portion 31 does not come into contact with any one of the Y coordinate detection electrodes 26 connected with one Y coordinate detection line 20, the voltage Vcom L is provided. At the time of touch that the contact portion 31 comes into contact with any one of Y coordinate detection electrodes 26 connected with the one Y coordinate detection line 20, a Y coordinate serial data signal that provides the voltage Vcom H after the reset is input to the Y coordinate detection comparator 42b.

Moreover, when the common signal on the L level is applied to the opposed electrode 16, as shown in FIG. 12, the voltage Vcom H is provided at the time of non-touch that the contact portion 31 does not come into contact with any one of the X coordinate detection electrodes 25 connected with one X coordinate detection line 19 in accordance with each selection period of the respective scanning lines 14. At the time of touch that the contact portion 31 comes into contact with any one of the X coordinate detection electrodes 25 connected with the one X coordinate detection line 19, an X coordinate serial data signal that provides the voltage Vcom L after the reset is input to the X coordinate detection comparator 42a. The voltage Vcom H is provided at the time of non-touch that the contact portion 31 does not come into contact with any one of the Y coordinate detection electrodes 26 connected with one Y coordinate detection line 20. At the time of touch that the contact portion 31 comes into contact with any one of the Y coordinate detection electrodes 26 connected with the one Y coordinate detection line 20, a Y coordinate serial data signal that provides the voltage Vcom L after the reset is input to the Y coordinate detection comparator 42b.

Figure 13:
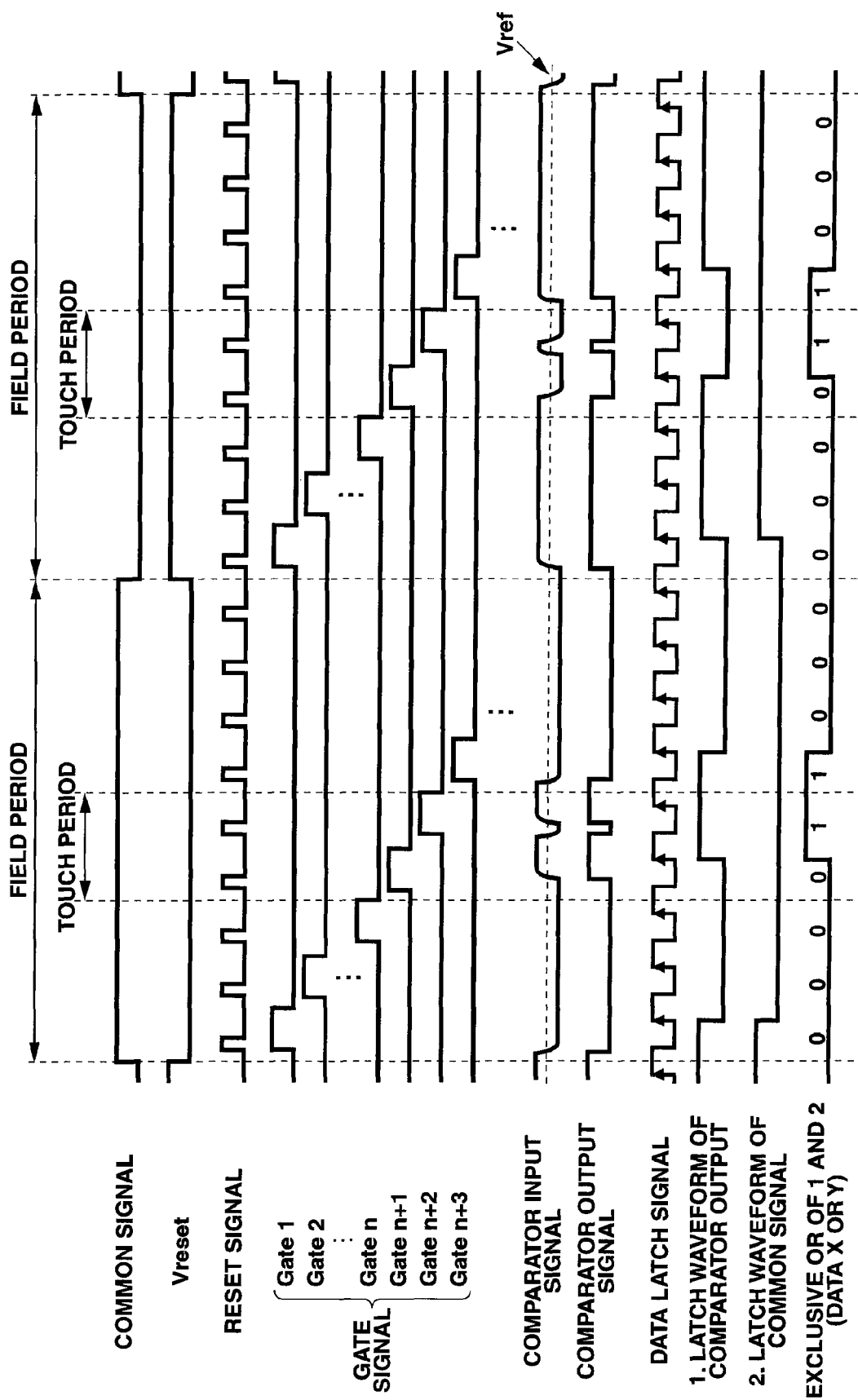
FIG. 13 is a waveform chart of each driving signal and each signal in a touch point coordinate detection system when driving the liquid crystal display apparatus in a frame reversal scheme.
Figure 14:
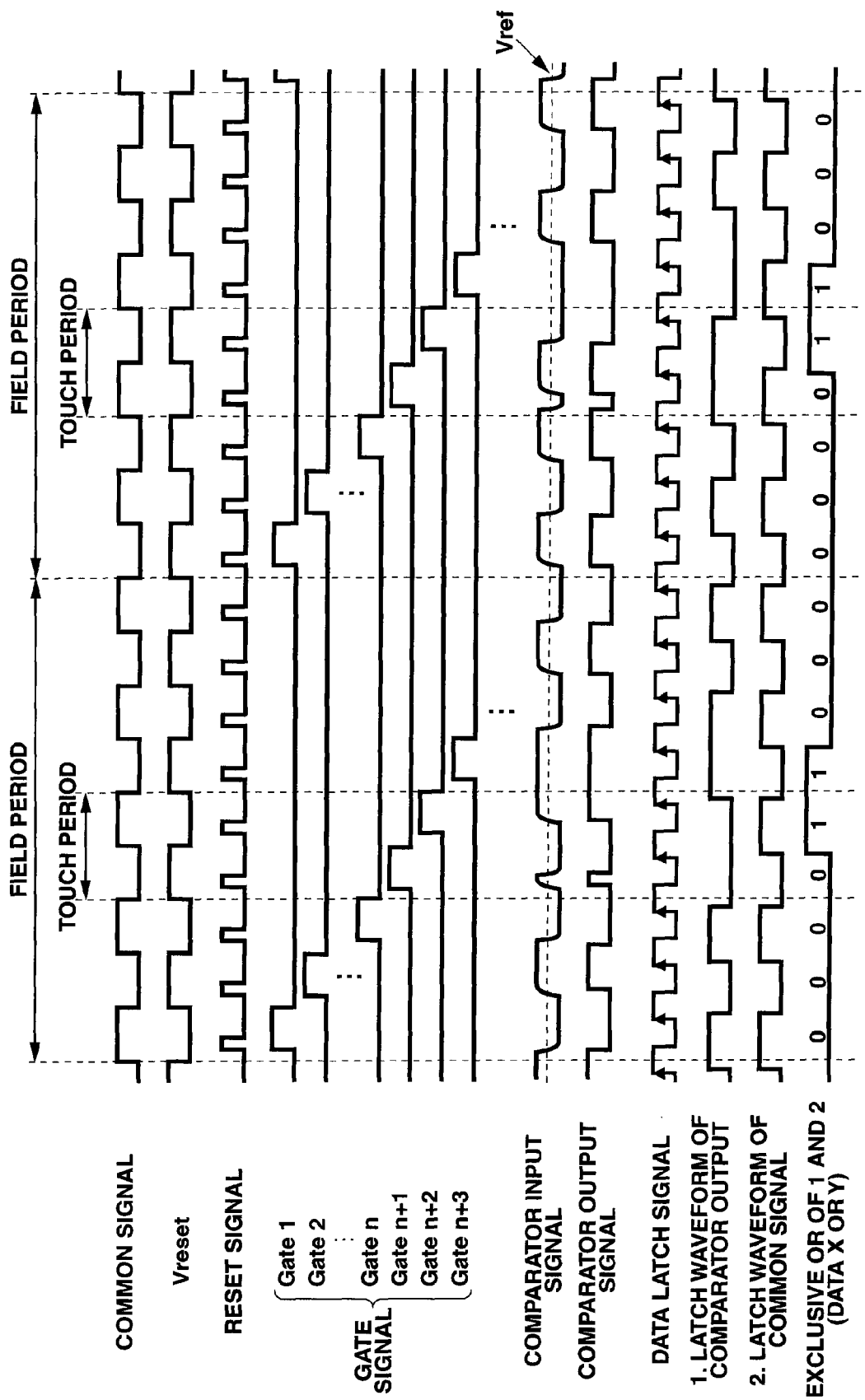
FIG. 14 is a waveform chart of each driving signal and each signal in the touch point coordinate detection system when driving the liquid crystal display apparatus in the frame reversal scheme.

In FIGS. 13 and 14, Gate 1, Gate 2, . . . , Gate n, Gate n+1, Gate n+2, and Gate n+3 denote gate signals applied to the respective first, second, . . . , nth, n+1th, n+2th, and n+3th scanning lines 14. When the liquid crystal display panel 1 is driven based on the frame reversal scheme, signals having such waveforms as shown in FIG. 13 are output from the X and Y coordinate detection comparators 42a and 42b in response to input of the serial data signals to these comparators 42a and 42b, and the coordinate detection controller 44a outputs X or Y coordinate data of the touch point based on a binary signal of "0" and "1" as an exclusive OR of a latch waveform of each comparator output and a latch waveform of the common signal.

Additionally, when the liquid crystal display panel 1 is driven based on the line reversal scheme, the X and Y coordinate detection comparators 42a and 42b output signals having such waveforms as depicted in FIG. 14 based on input of the serial data signals to the X and Y coordinate detection comparators 42a and 42b, and the coordinate detection controller 44a outputs X or Y coordinate data of a touch point constituted of a binary signal of "0" and "1" as an exclusive OR of a latch waveform of each comparator output and a latch waveform of the common signal.

According to the liquid crystal display apparatus 1a, in the region outside the screen area 2 of the rear substrate 3, the X coordinate detection TFTs 6a having the gate electrodes 7 connected with the respective scanning lines 14 and having the source electrodes 12 connected with the respective X coordinate detection lines 19, the Y coordinate detection TFTs 6b having the gate electrodes 7 connected with the respective scanning lines 4 and having the source electrodes 12 connected with the respective Y coordinate detection lines 20, the X coordinate detection output line 21a connected with the drain electrode 13 of each X coordinate detection TFT 6a, and the Y coordinate detection output line 21b having the drain electrode 13 connected with each Y coordinate detection TFT 6b are provided. Therefore, since each of the X coordinate parallel data corresponding to the charge voltage for each X coordinate detection line 19 and the Y coordinate parallel data corresponding to the charge voltage for each Y coordinate detection line 20 can be converted into serial data to be output to the coordinate detection circuit 44, though the liquid crystal display panel performs the touch panel function, the number of connection terminals of the liquid crystal display panel 1 and the coordinate detection circuit 44 can be reduced to be smaller than the number of detectable coordinate points. Furthermore, since parallel/serial conversion can be effected in the liquid crystal display panel, the configuration of the coordinate detection circuit 44 can be greatly simplified as compared with a circuit including a conventional parallel/serial conversion circuit.

That is, the X coordinate detection TFTs 6a and the X coordinate detection output line 21a are formed in the liquid crystal display panel 1 as a parallel/serial conversion circuit corresponding to the X coordinate axis, and the Y coordinate detection TFTs 6b and the Y coordinate detection output line 21b are formed in the liquid crystal display panel 1 as a parallel/serial conversion circuit corresponding to the Y coordinate axis.

Moreover, in the liquid crystal display apparatus 1a, since each X coordinate detection TFT 6a and each Y coordinate detection TFT 6b are arranged in the region outside the screen area on one end side of each scanning line 14 and each Y coordinate detection line 20, an arrangement space of each X coordinate detection TFT 6a and each Y coordinate detection TFT 6b can be consolidated, thereby alleviating an increase in size of the liquid crystal display apparatus caused due to provision of each X coordinate detection TFT 6a and each Y coordinate detection TFT 6b.

Additionally, in the liquid crystal display apparatus 1a, since each of the X coordinate detection TFT 6a and the Y coordinate detection TFT 6b is formed into the same laminated structure as the display TFT 6, the display TFT 6, the X coordinate detection TFT 6a and the Y coordinate detection TFT 6b can be collectively formed, thereby manufacturing the apparatus at a low cost in a process that is almost the same as manufacture of an active matrix liquid crystal display apparatus having no touch apparatus function.

Further, in the liquid crystal display apparatus 1a, the X coordinate detection electrode 25 and the Y coordinate detection electrode 26 are formed on one or both of the X coordinate detection line 19 and the Y coordinate detection line 20 (on the Y coordinate detection line 20 in the embodiment) through the insulating film (the overcoat insulating film 23 in this embodiment), and these electrodes are connected with the X coordinate detection line 19 and the Y coordinate detection line 20 in the contact holes 29 and 30 provided in the insulating film, whereby each pixel electrode 5 that is adjacent to the arrangement portion of the X coordinate detection electrode 25 and the Y coordinate detection electrode 26 can be formed with a sufficient area.

Figure 21:
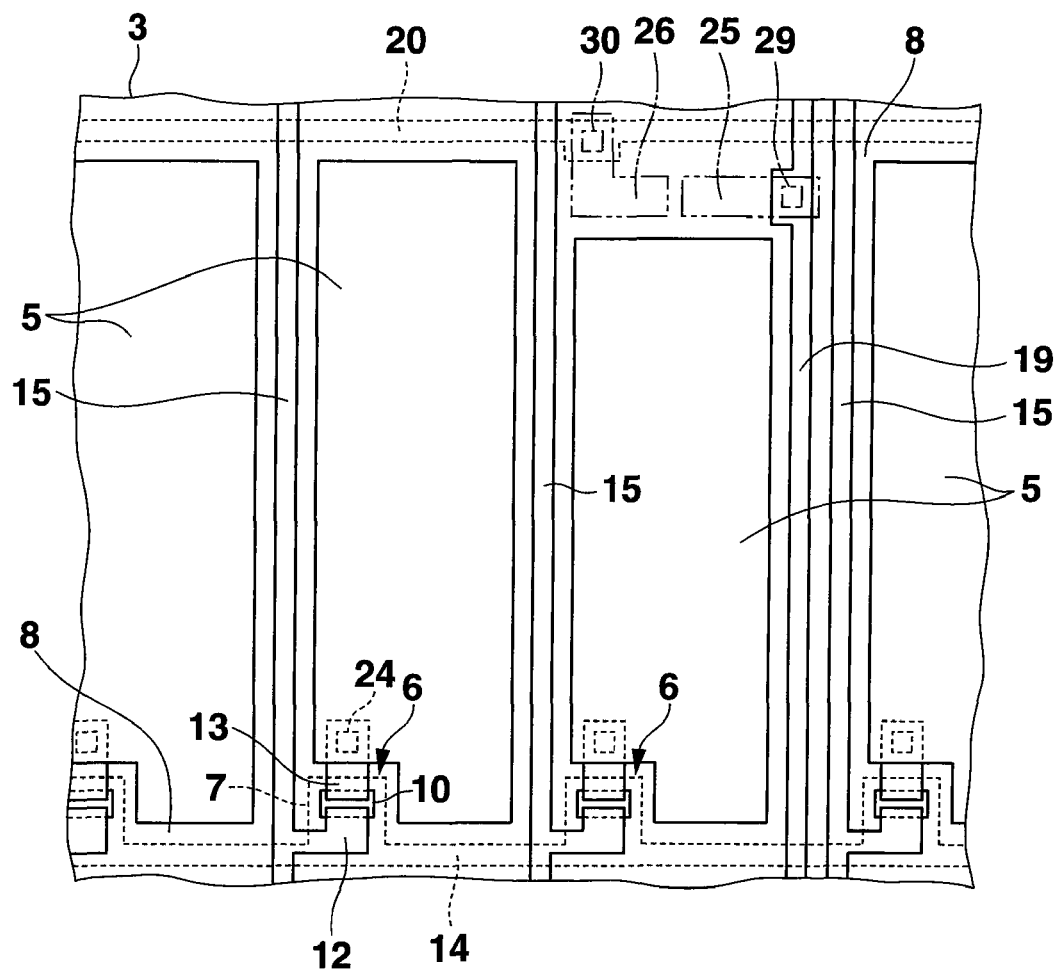
FIG. 21 is a partially enlarged plan view of a screen area of a first substrate in a liquid crystal display apparatus according to a comparative example.

That is, in the liquid crystal display apparatus according to the comparative example shown in FIG. 21, the X coordinate detection electrode 25 and the Y coordinate detection electrode 26 are arranged between the Y coordinate detection line 20 and the pixel electrode 5. It is to be noted that a description on any other structure in the liquid crystal display apparatus according to this comparative example will be omitted by giving the same reference numerals to members corresponding to those in the foregoing embodiment.

In the liquid crystal display apparatus according to this comparative example, since the arrangement space for the X coordinate detection electrode 25 and the Y coordinate detection electrode 26 must be assured between the Y coordinate detection line 20 and the pixel electrode 5, each pixel electrode 5 adjacent to the arrangement portion of these contact electrodes 25 and 26 must be formed to be greatly apart from the Y coordinate detection line 20. Therefore, an area of the pixel electrode 5 adjacent to the arrangement portion of the contact electrodes 25 and 26 becomes considerably small, thereby greatly reducing an aperture ratio of a pixel corresponding to this pixel electrode 5.

Contrary to the liquid crystal display apparatus according to the comparative example, since the X coordinate detection electrode 25 and the Y coordinate detection electrode 26 are arranged on the Y coordinate detection line 20 in the liquid crystal display apparatus 1a according to the foregoing embodiment, the gap between the Y coordinate detection line 20 and the pixel electrode 5 can be very small. Therefore, the pixel electrode 5 adjacent to the arrangement portion of the X coordinate detection electrode 25 and the Y coordinate detection electrode 26 can be formed with a sufficient area, and a reduction in aperture ratio of a pixel corresponding to this pixel electrode 5 can be decreased as much as possible.

Further, in the liquid crystal display apparatus 1a according to the foregoing embodiment, each X coordinate detection line 19 is formed of the same metal film as the gate electrode 7 of the display TFT 6, each Y coordinate detection line 20 is formed of the same metal film as the source electrode 12 and the drain electrode 13 of the display TFT 6, the insulating film is the gate insulating film 8 of each display TFT 6 and the overcoat insulating film 23 provided to cover each display TFT 6, each scanning line 14 and each signal line 15, the basal portion 27 formed into the same laminated structure as the laminated structure including the overcoat insulating film 23 of the display TFT 6 is formed on the rear substrate 3 corresponding to the region of the X coordinate detection electrode 25 and the Y coordinate detection electrode 26 with which the contact portion 31 formed on at least the opposed electrode 16 comes into contact on the rear substrate 3, and the X coordinate detection electrode 25 and the Y coordinate detection electrode 26 are formed on this basal portion 27. Therefore, the surfaces of the contact electrodes 25 and 26 with which the contact portion 31 comes into contact can be formed to be sufficiently higher than the pixel electrode 5 or the Y coordinate detection line 20, and the contact portion 31 can be assuredly brought into contact with the X coordinate detection electrode 25 and the Y coordinate detection electrode 26 alone.

Furthermore, in the liquid crystal display apparatus 1a, since the basal portion 27 is formed into the same laminated structure as the laminated structure including the overcoat insulating 23 of each TFT 6, 6a or 6b, the basal portion 27 can be formed by utilizing the formation process of the display TFT 6, the X coordinate detection TFT 6a and the Y coordinate detection TFT 6b.

It is to be noted that the basal portion 27 is not restricted to the laminated structure completely equal to the laminated structure of each TFT 6, 6a or 6b, and it may be formed into a laminated structure obtained by eliminating the blocking insulating film 10 from the laminated structure of each TFT 6, 6a or 6b. That is, the basal portion 27 may be formed of a laminated film including the Y coordinate detection line 20, the gate insulating film 8, a two-layer film equal to respective films, i.e., the i-type semiconductor film 9 and the n-type semiconductor film 11, the upper metal film 28 constituted of the same metal film as the source and drain electrodes 12 and 13 of each TFT 6, 6a or 6b and the X coordinate detection line 19, and the overcoat insulating film 23. In this case, the basal portion 27 can be formed by utilizing the formation process of the display TFT 6, the X coordinate detection TFT 6a and the Y coordinate detection TFT 6b, and the contact portion 31 can be assuredly brought into contact with the X coordinate detection electrode 25 and the Y coordinate detection electrode 26 formed on the basal portion 27 alone.

Figure 8:
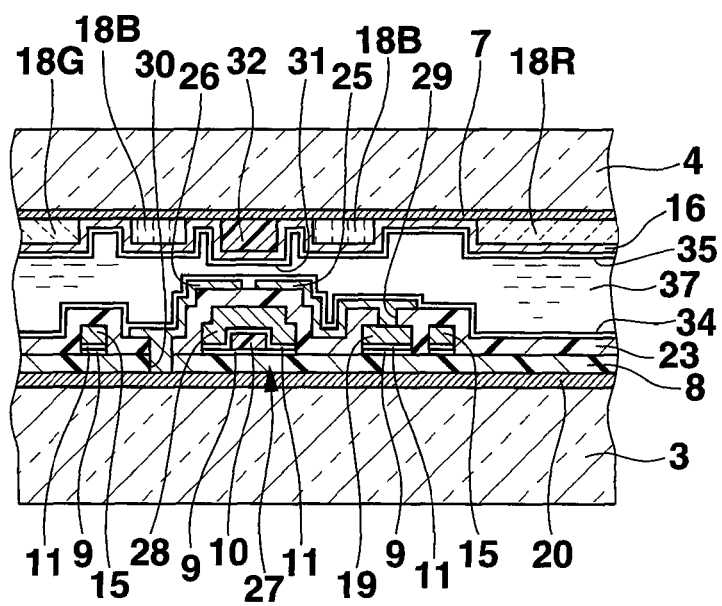
FIG. 8 is a cross-sectional view of the liquid crystal display apparatus in the first embodiment taken along a line VIII-VIII in FIG. 4.
Figure 9:
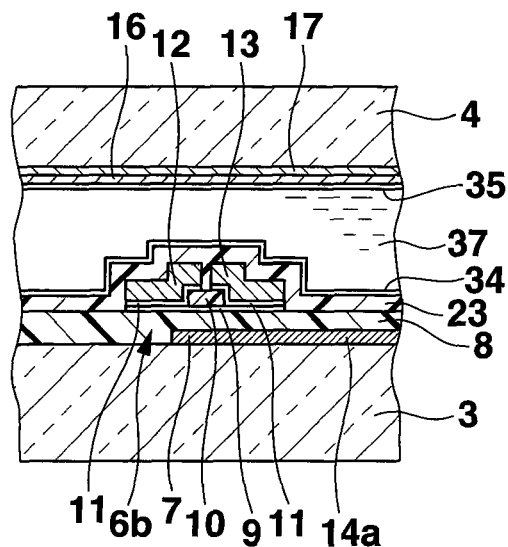
FIG. 9 is a cross-sectional view of the liquid crystal display apparatus in the first embodiment taken along a line IX-IX in FIG. 5.
Figure 10:
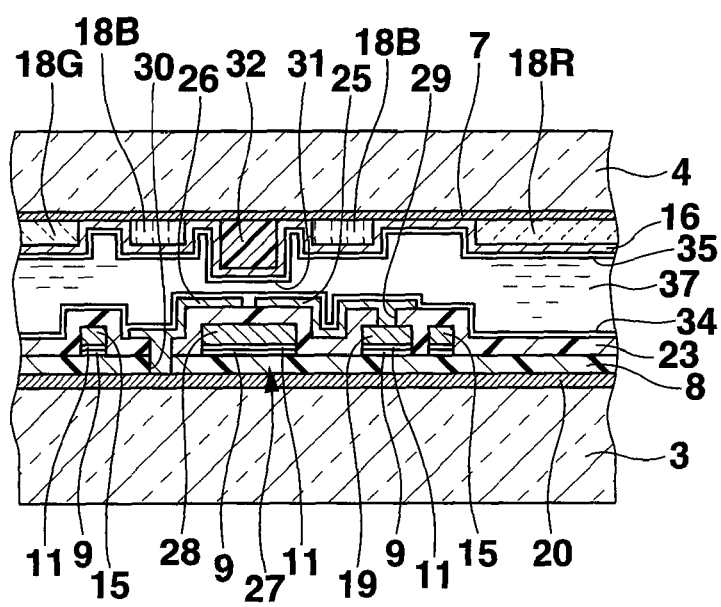
FIG. 10 is a cross-sectional view of a portion corresponding to FIG. 8 showing a modification of a basal portion forming a contact electrode.

In this modification, since the height of the basal portion 27 is reduced for an amount corresponding to a film thickness of the blocking insulating film 10 as compared with the embodiment depicted in FIG. 8, positions of the X coordinate detection electrode 25 and the Y coordinate detection electrode 26 are thereby lowered. However, each contact portion 31 can be caused to face the X coordinate detection electrode 25 and the Y coordinate detection electrode 26 to interpose the gap therebetween by increasing the protruding height of each contact portion 31 on the inner surface of the front substrate 4, and it can be brought into contact with the X coordinate detection electrode 25 and the Y coordinate detection electrode 26 based on flexural deformation in the inner surface direction due to tough from the outer surface side of the front substrate 4.

[Second Embodiment]

Figure 15:
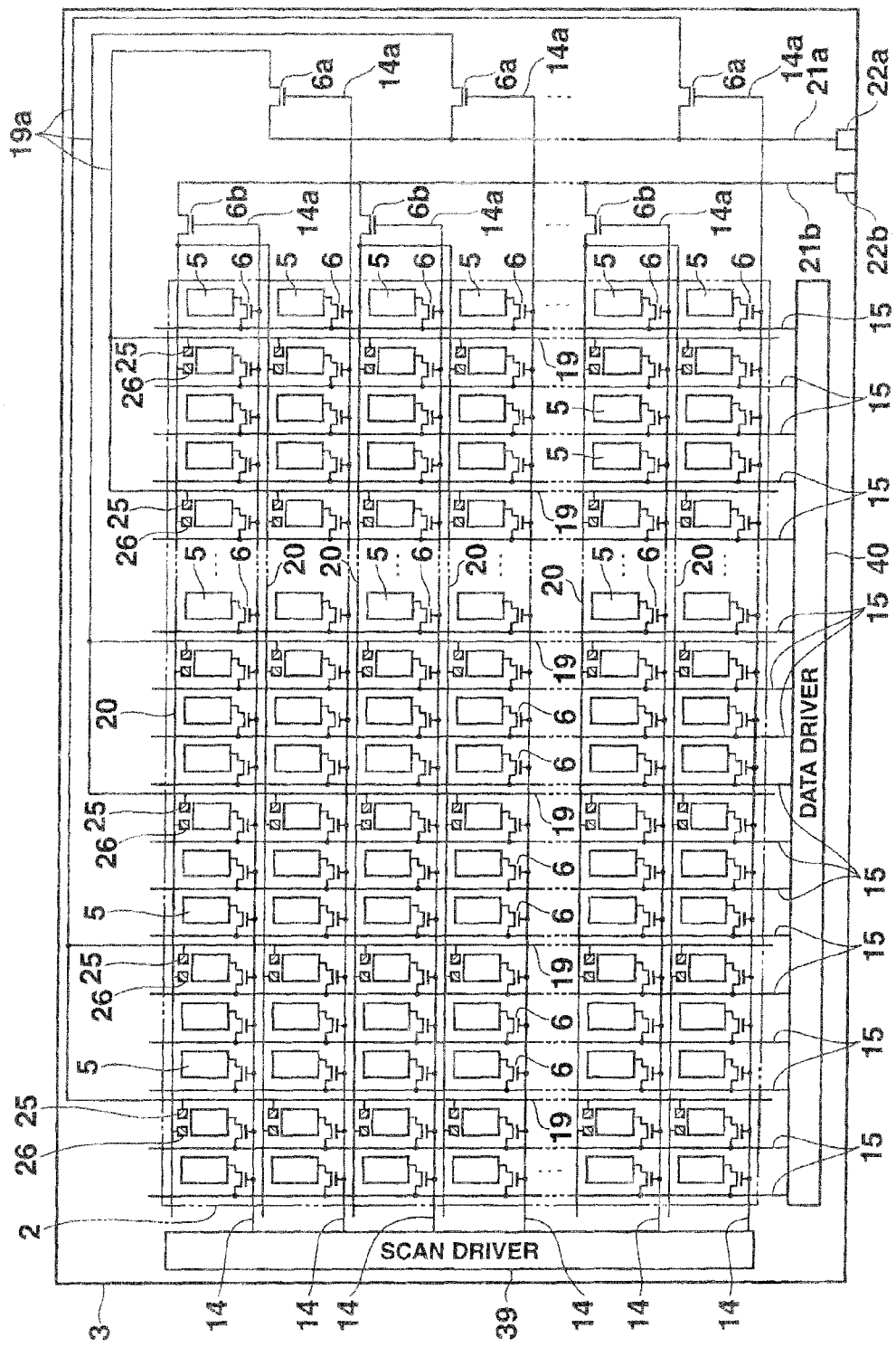
FIG. 15 is a circuit block diagram of a first substrate of a liquid crystal display apparatus in a second embodiment according to the present invention.
Figure 16:
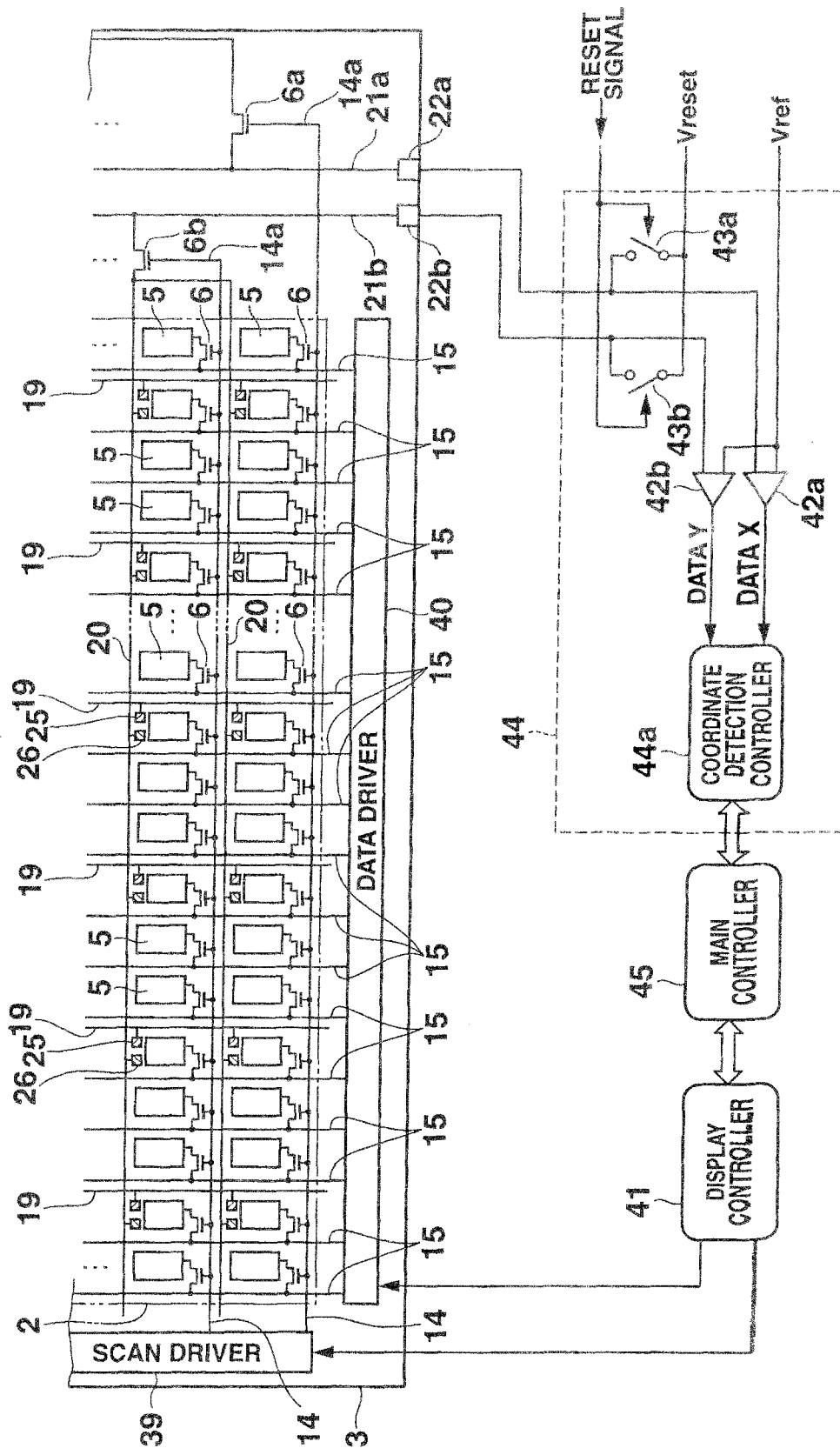
FIG. 16 is an external circuit diagram in the second embodiment.

In a liquid crystal display apparatus according to a second embodiment depicted in FIG. 15, each Y coordinate detection line 20 is provided every predetermined number of pixel electrode rows, e.g., every row of the pixel electrodes 5, each X coordinate detection line 19 is provided every predetermined number of columns, e.g., every three columns of the pixel electrodes 5, each X coordinate detection TFT 6a is arranged in accordance with every other scanning line 14 of the respective scanning lines 14 corresponding to the respective pixel electrode columns where the Y coordinate detection line 20 is provided, and each Y coordinate detection TFT 6b is arranged in accordance with every other remaining scanning lines 14 of the respective scanning lines 14.

Additionally, in this embodiment, each scanning line 14 is connected with a gate electrode 7 of the X coordinate detection TFT 6a or the Y coordinate detection TFT 6b corresponding to this scanning line 14. A predetermined number of X coordinate detection lines 19 that are adjacent to each other, e.g., two X coordinate detection lines 19 form one set to be connected with a source electrode 12 of each X coordinate detection TFT 6a in accordance with each set. A predetermined number of Y coordinate detection lines 20, e.g., two Y coordinate detection lines 20 form one set to be connected with the source electrode 12 of each Y coordinate detection TFT 6b in accordance with each set.

Further, a drain electrode 13 of each X coordinate detection TFT 6a is connected with one X coordinate detection output line 21a, and the drain electrode 13 of each Y coordinate detection TFT 6b is connected with one Y coordinate detection output line 21b. It is to be noted that other structures in the liquid crystal display apparatus according to this embodiment are equal to those in the first embodiment, and hence like reference numerals denote like parts to omit a tautological explanation.

In the liquid crystal display apparatus according to this embodiment, the respective X coordinate detection lines 19 are provided every three columns of the respective pixel electrodes 5, the respective X coordinate detection TFTs 6a are arranged in accordance with every other scanning lines 14 of the respective scanning lines 14, the respective Y coordinate detection TFTs 6b are arranged every other remaining scanning lines 14 of the respective scanning lines 14, each scanning line 14 is connected with the gate electrode 7 of the X coordinate detection TFT 6a or the Y coordinate detection TFT 6b corresponding to this scanning line 14, two X coordinate detection lines 19 which are adjacent to each other form one set to be connected with the source electrode 12 of each X coordinate detection TFT 6a in accordance with each set, and two Y coordinate detection lines 20 which are adjacent to each other form one set to be connected with the source electrode 12 of each Y coordinate detection TFT 6b in accordance with each set, thereby substantially halving the number of the X coordinate detection TFTs 6a and the Y coordinate detection TFTs 6b as compared with the first embodiment.

Therefore, according to the liquid crystal display apparatus of this embodiment, an arrangement space of the X coordinate detection TFT 6a and the Y coordinate detection TFT 6b assured in a region outside a screen area 2 can be greatly reduced as compared with the first embodiment, thus further alleviating an increase in size of the liquid crystal display apparatus due to provision of each X coordinate detection TFT 6a and each Y coordinate detection TFT 6b.

Furthermore, in the liquid crystal display apparatus according to this embodiment, the two X coordinate detection lines 19 which are adjacent to each other form one set to be connected with the source electrode 12 of each X coordinate detection TFT 6a in accordance with each set, the two Y coordinate detection lines 20 which are adjacent to each other form one set to be connected with the source electrode 12 of each Y coordinate detection TFT 6b in accordance with each set. Therefore, for example, when the X coordinate detection TFTs 6a and the Y coordinate detection TFTs 6b which are equal to those in the first embodiment in number are arranged in the region outside the screen area, the X coordinate detection lines 19 can be arranged every predetermined number of rows smaller than three rows, e.g., every other row or every row. In this case, an arrangement pitch of the X coordinate detection electrode 25 and the Y coordinate detection electrode 26 in the row direction can be reduced, and an X coordinate of a touch point can be further accurately detected.

It is to be noted that, in the second embodiment, the two X coordinate detection lines 19 which are adjacent to each other form one set to be connected with the source electrode 12 of each X coordinate detection TFT 6a in accordance with each set and the two Y coordinate detection lines 20 which are adjacent to each other form one set to be connected with the source electrode 12 of each Y coordinate detection TFT 6b in accordance with each set. The present invention is not restricted thereto, any other number, e.g., three to five X coordinate detection lines 19 may form one set to be connected with the source electrode 12 of each X coordinate detection TFT 6a in accordance with each set, and three to five Y coordinate detection lines 20 which are adjacent to each other may form one set to be connected with the source electrode 12 of each Y coordinate detection TFT 6b in accordance with each set. Based on this configuration, an arrangement space of the X coordinate detection TFT 6a and the Y coordinate detection TFT 6b assured in the region other than the screen area can be further reduced, thereby further alleviating an increase in size of the liquid crystal display apparatus caused due to provision of each X coordinate detection TFT 6a and each Y coordinate detection TFT 6b.

[Third Embodiment]

Figure 17:
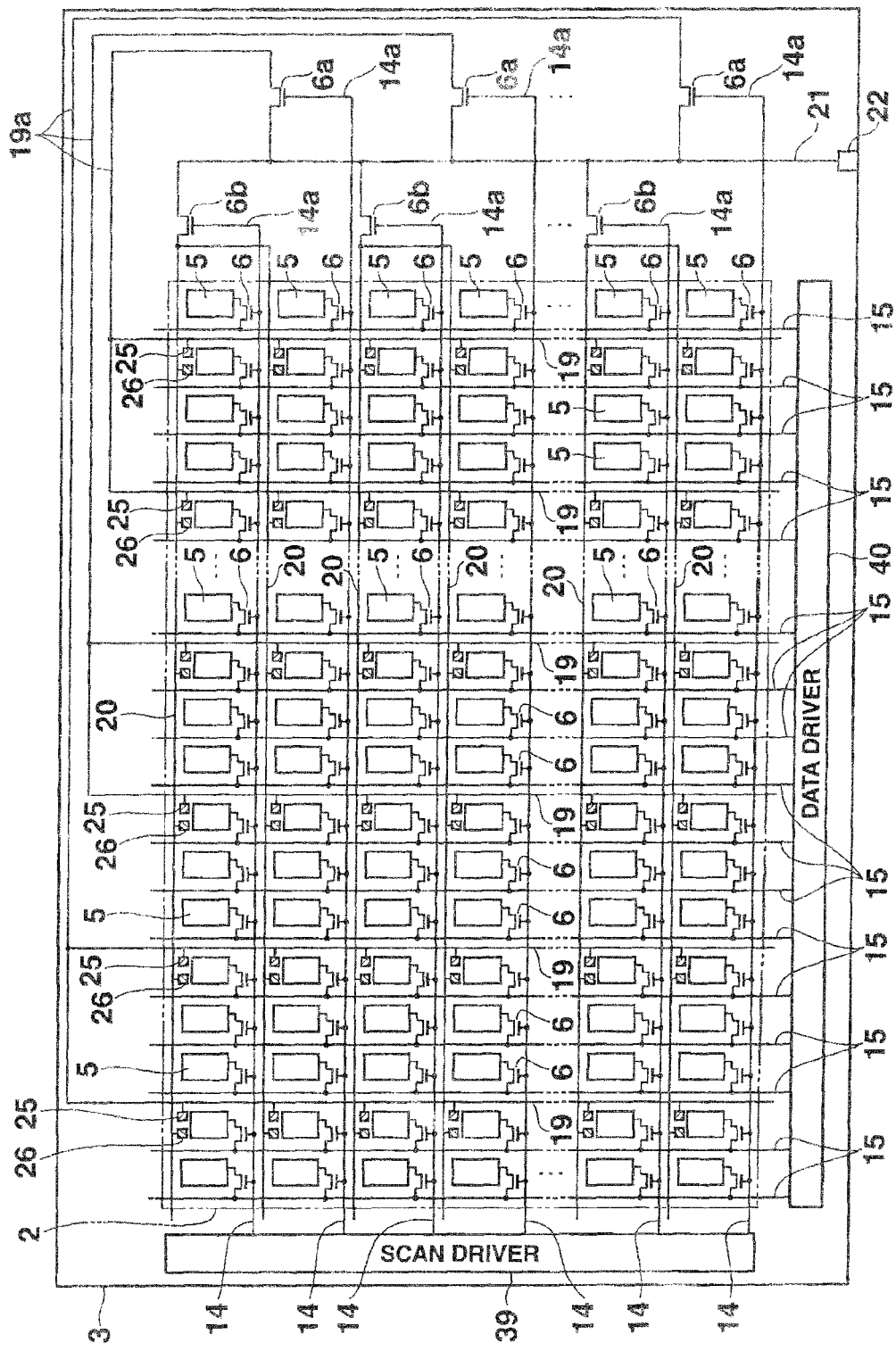
FIG. 17 is a circuit block diagram of a first substrate of a liquid crystal display apparatus in a third embodiment according to the present invention.
Figure 18:
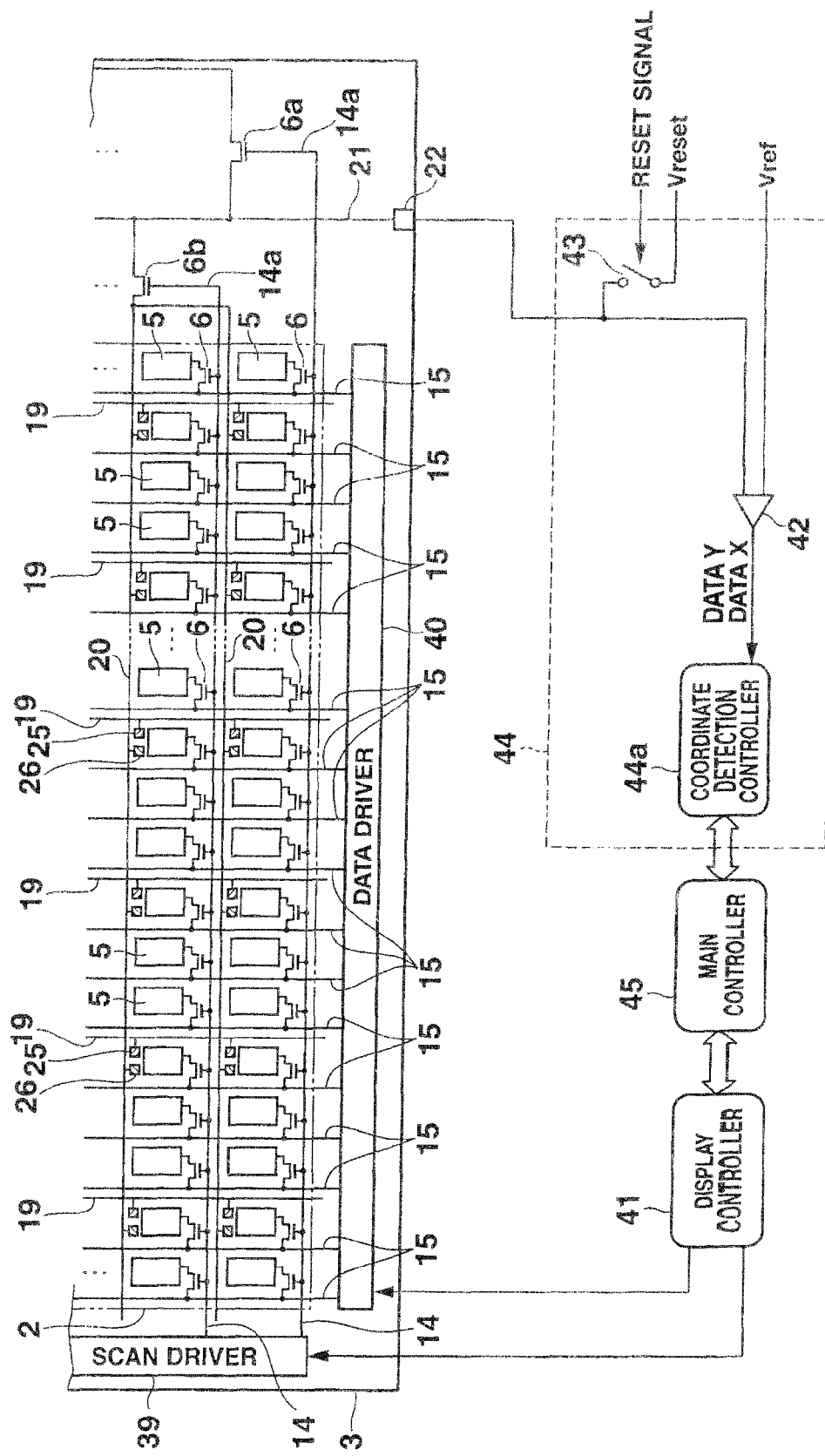
FIG. 18 is an external circuit diagram in the third embodiment.

A liquid crystal display apparatus according to a third embodiment depicted in FIGS. 17 and 18 has a configuration that the drain electrode 13 of each X coordinate detection TFT 6a and the drain electrode 13 of each Y coordinate detection TFT 6b are connected with a common output line 21 for both X coordinate detection and Y coordinate detection and this common output line 21 outputs a serial data signal that alternately includes an X coordinate and a Y coordinate in a cycle synchronized with a selection period of respective scanning lines 14 in the liquid crystal display apparatus according to the second embodiment.

Furthermore, in this third embodiment, as shown in FIG. 18, external circuits include one comparator 42 for both X coordinate detection and Y coordinate detection, this comparator 42 alternately inputs data X and data Y to a coordinate detection controller 44a, and the coordinate detection controller 44a discriminates the data X and the data Y in synchronization with the selection period of the respective scanning lines 14, thereby detecting an X coordinate and a Y coordinate of a touch point based on the data X and the data Y.

According to the third embodiment, since the output line from which the serial data signal is output is the single common output line 21 for both X coordinate detection and Y coordinate detection alone, an arrangement space of the X coordinate detection TFT 6a and the Y coordinate detection TFT 6b assured in a region other than a screen area 2 can be further reduced to be smaller than the second embodiment, thereby alleviating an increase in size of the liquid crystal display apparatus caused due to provision of each X coordinate detection TFT 6a and each Y coordinate detection TFT 6b.

Moreover, according to the third embodiment, since providing the single comparator 42 for both X coordinate detection and Y coordinate detection alone can suffice as the comparator provided in the external circuits, the external circuits can be further simplified as compared with the second embodiment.

[Fourth Embodiment]

Figure 19:
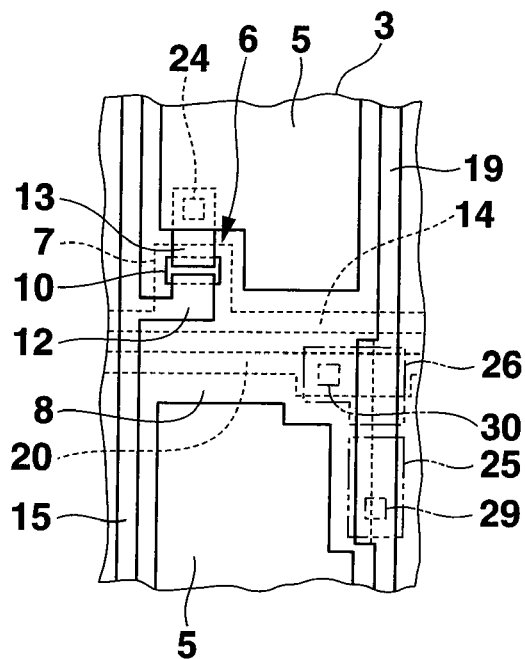
FIG. 19 is a plan view of an X coordinate detection electrode and a Y coordinate detection contact electrode showing a fourth embodiment of the present invention.

In a liquid crystal display apparatus according to a fourth embodiment depicted in FIG. 19, the X coordinate detection electrode 25 and the Y coordinate detection electrode 26 are arranged at positions different from those in the first to third embodiments. In this embodiment, the X coordinate detection electrode 25 and the Y coordinate detection electrode 26 are arranged on an X coordinate detection line 19, an end portion of the Y coordinate detection electrode 26 on the opposite side of the side neighboring the X coordinate detection electrode 25 is formed into a shape bent in a direction of a Y coordinate detection line 20 on a line intersecting portion of the X coordinate detection line 19 and the Y coordinate detection line 20, and a bent portion of this Y coordinate detection electrode 26 is connected with the Y coordinate detection line 20 in a contact hole 30 provided in an overcoat insulating film 23. It is to be noted that structures except the arrangement of the X coordinate detection electrode 25 and the Y coordinate detection electrode 26 are equal to those in any one of the first to third embodiment, and hence like reference numerals denote like parts in the drawing to omit a tautological explanation.

[Fifth Embodiment]

Figure 20:
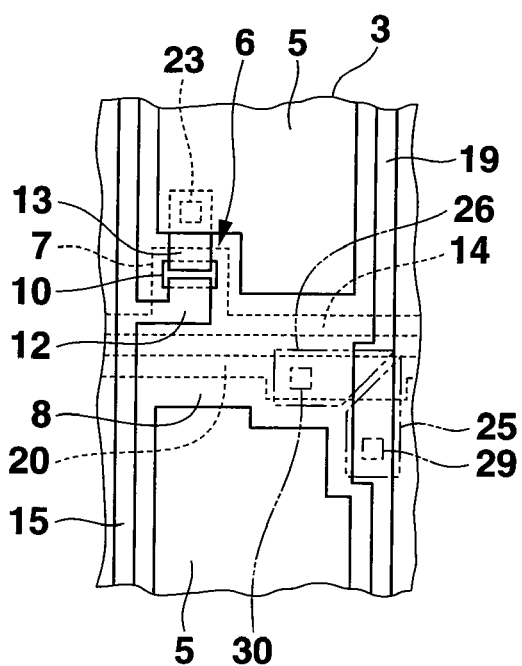
FIG. 20 is a plan view of an X coordinate detection electrode and a Y coordinate detection contact electrode showing a fifth embodiment according to the present invention.

In a liquid crystal display apparatus according to a fifth embodiment depicted in FIG. 20, the X coordinate detection electrode 25 and the Y coordinate detection electrode 26 are arranged at positions different from those in the first to fourth embodiments. In this embodiment, the X coordinate detection electrode 25 is arranged on a Y coordinate detection line 20, the Y coordinate detection electrode 26 is arranged on the Y coordinate detection line 20, end portions of the X coordinate detection electrode 25 and the Y coordinate detection electrode 26 are adjacent to each other on the line intersecting portion. It is to be noted that structures other than the arrangement of the X coordinate detection electrode 25 and the Y coordinate detection electrode 26 are equal to those in any one of the first to third embodiments, and hence like reference numerals denote like parts in the drawing to omit a tautological explanation thereof.

[Any Other Embodiment]

It is to be noted that the X coordinate detection electrode 25 and the Y coordinate detection electrode 26 are arranged on one or both of the X coordinate detection line 19 and the Y coordinate detection line 20 in each of the foregoing embodiments, but the X coordinate detection electrode 25 and the Y coordinate detection electrode 26 may be arranged between the X coordinate detection line or the Y coordinate detection line 20 and the pixel electrode 5 like the comparative example depicted in FIG. 21 when a reduction in an aperture ratio of a pixel adjacent to the arrangement portion of the X coordinate detection electrode 25 and the Y coordinate detection electrode 26 is allowed to some extent.

[Examples of Devices Having This Liquid Crystal Display Apparatus Mounted Thereon]

Figure 22:
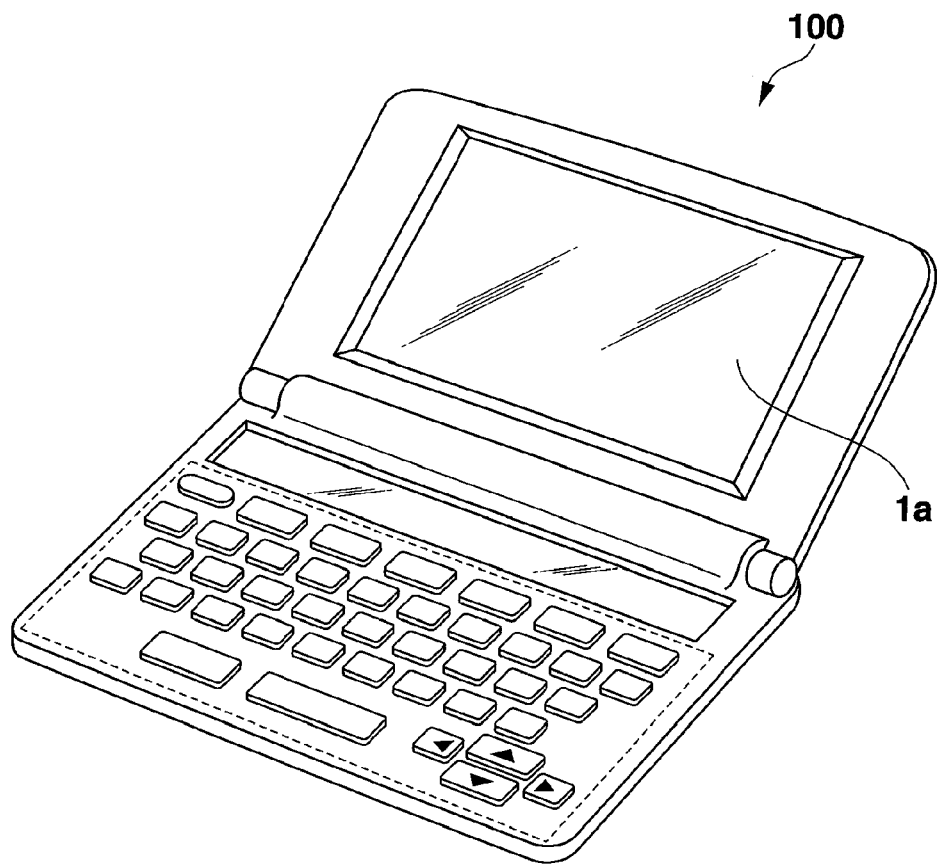
FIG. 22 is a perspective view of a first electronic device including the liquid crystal display apparatus according to the present invention.
Figure 23:
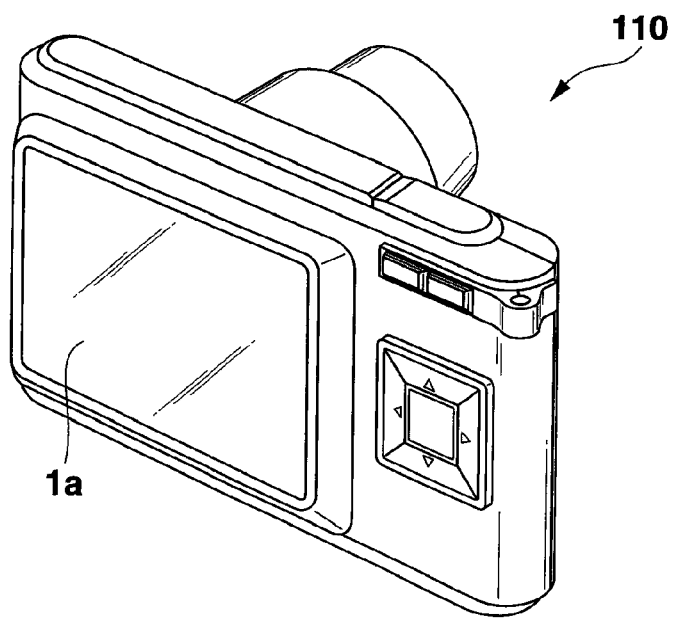
FIG. 23 is a perspective view of a second electronic device including the liquid crystal display apparatus according to the present invention.
Figure 24:
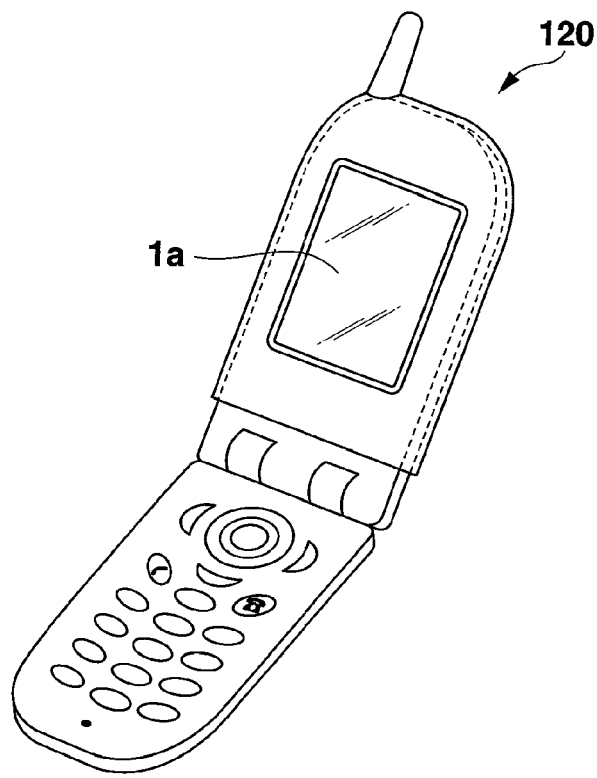
FIG. 24 is a perspective view of a third electronic device including the liquid crystal display apparatus according to the present invention.
Figure 25:
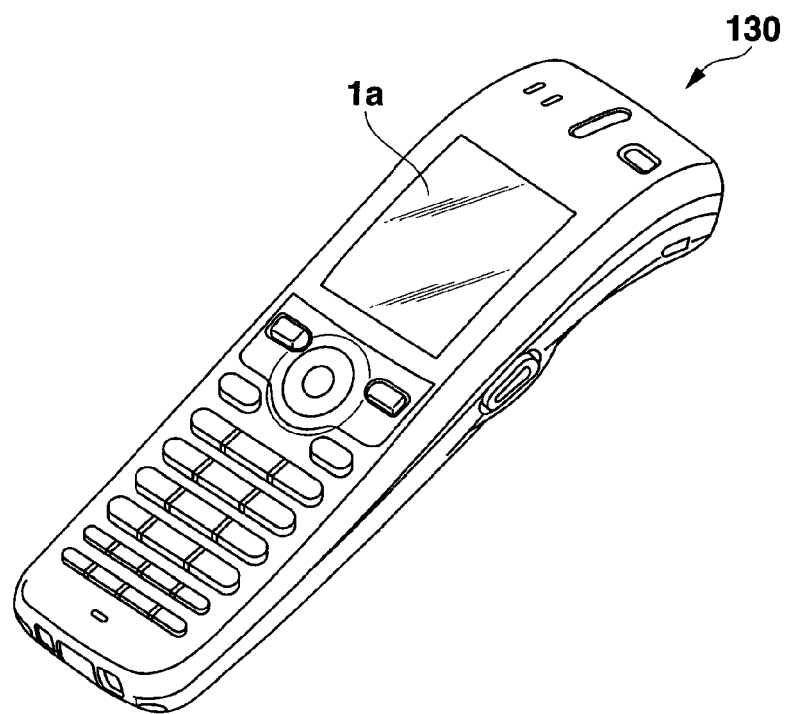
FIG. 25 is a perspective view of a fourth electronic device including the liquid crystal display apparatus according to the present invention.

Each of first to fourth electronic devices depicted in FIGS. 22 to 25 has a liquid crystal display apparatus 1a according to the present invention mounted thereon, a first electronic device 100 in FIG. 22 is a notebook computer, a second electronic device 110 in FIG. 23 is a digital camera, a third electronic device 120 in FIG. 24 is a mobile phone, and a fourth electronic device 130 in FIG. 25 is a handy terminal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display panel in which pixel electrodes connected with pixel transistors are arranged to face an opposed electrode through a liquid crystal layer per each pixel and an alignment direction of liquid crystal molecules in the liquid crystal layer changes by controlling a voltage between the pixel electrodes and the opposed electrode, the liquid crystal display panel comprising:

scanning lines which extend in parallel to each other and through which ON signals for turning on respective corresponding pixel transistors during a predetermined period are supplied to the respective corresponding pixel transistors;

first coordinate detection electrodes which are arranged in a predetermined direction, wherein different pluralities of the first coordinate detection electrodes correspond to different ones of the scanning lines;

first coordinate detection transistors, one of which electrically connects one of the different pluralities of the first coordinate detection electrodes corresponding to one of the scanning lines to an output line commonly connected with the first coordinate detection transistors based on one of the ON signals supplied to the pixel transistors from said one of the scanning lines;

second coordinate detection electrodes which are arranged along parallel lines perpendicular to the predetermined direction, wherein different pluralities of the second coordinate detection electrodes correspond to different ones of the scanning lines, other than the ones of the scanning lines to which the pluralities of the first coordinate detection electrodes correspond; and second coordinate detection transistors, one of which electrically connects one of the different pluralities of the second coordinate detection electrodes corresponding to one of the scanning lines to the output line, which is commonly connected with the second coordinate detection transistors, based on one of the ON signals supplied to the pixel transistors from said one of the scanning lines.

2. The liquid crystal display panel according to claim 1, wherein the pixel transistors, the first coordinate detection transistors, and the output line are formed on a same substrate.

3. The liquid crystal display panel according to claim 1, wherein the pixel transistors, the second coordinate detection transistors, and the output line are formed on a same substrate.

4. The liquid crystal display panel according to claim 1, further comprising:

a first substrate on which the first coordinate detection electrodes are formed; and a second substrate which is arranged to face the first substrate and on which the opposed electrode is formed, wherein the second substrate includes protruding contact portions which come into contact with the first coordinate detection electrodes when the second substrate undergoes flexural deformation due to pressing.

5. The liquid crystal display panel according to claim 1, further comprising a single comparator for both X coordinate detection and Y coordinate detection in an external circuit.

6. A liquid crystal display apparatus in which pixel electrodes connected with pixel transistors are arranged to face an opposed electrode through a liquid crystal layer per each pixel and an alignment direction of liquid crystal molecules in the liquid crystal layer is controlled by controlling a voltage applied to a space between the pixel electrodes and the opposed electrode, the liquid crystal display panel comprising:
- a scan driver which sequentially outputs ON signals for turning on the pixel transistors during a predetermined period to scanning lines extending in parallel to each other;
- first coordinate detection electrodes which are arranged in a predetermined direction, wherein different pluralities of the first coordinate detection electrodes correspond to different ones of the scanning lines;
- first coordinate detection transistors, one of which electrically connects one of the different pluralities of the first coordinate detection electrodes corresponding to one of the scanning lines to an output line commonly connected with the first coordinate detection transistors based on one of the ON signals supplied to the pixel transistors from said one of the scanning lines;
- second coordinate detection electrodes which are arranged along parallel lines perpendicular to the predetermined direction, wherein different pluralities of the second coordinate detection electrodes correspond to different ones of the scanning lines, other than the ones of the scanning lines to which the pluralities of the first coordinate detection electrodes correspond; and
- second coordinate detection transistors, one of which electrically connects one of the different pluralities of the second coordinate detection electrodes corresponding to one of the scanning lines to the output line, which is commonly connected with the second coordinate detection transistors, based on one of the ON signals supplied to the pixel transistors from said one of the scanning lines,
- wherein the pixel transistors, the first coordinate detection transistors, the second coordinate detection transistors, and the output line are formed on a same substrate.

7. The apparatus according to claim 6, further comprising a coordinate detection circuit which causes the first coordinate detection electrodes and the second coordinate detection electrodes to hold a reset voltage different from a voltage of the opposed electrode in synchronization with an output timing of the ON signals output from the scan driver.

8. The apparatus according to claim 6, further comprising a coordinate detection circuit which detects a contact position on a substrate having the opposed electrode with respect to the substrate having the first coordinate detection electrodes based on voltage information in the first coordinate detection electrodes detected through the output line.

9. The apparatus according to claim 6, wherein the substrate on which the first coordinate detection electrodes are formed is a first substrate;
wherein the apparatus further comprises a second substrate which is arranged to face the first substrate and on which the opposed electrode is formed, and
wherein the second substrate includes protruding contact portions which come into contact with the first coordinate detection electrodes when the second substrate undergoes flexural deformation due to pressing.

10. The apparatus according to claim 9, further comprising a coordinate detection circuit which detects the first coordinate detection electrode that has come into contact with the protruding contact portion based on voltage information in the first coordinate detection electrodes detected through the output line.

11. The apparatus according to claim 6, further comprising a single comparator for both X coordinate detection and Y coordinate detection in an external circuit.

12. A liquid crystal display panel in which pixel electrodes connected with pixel transistors are arranged to face an opposed electrode through a liquid crystal layer per each pixel and an alignment direction of liquid crystal molecules in the liquid crystal layer changes by controlling a voltage between the pixel electrodes and the opposed electrode, the liquid crystal display panel comprising:
- scanning lines which extend in parallel to each other and through which ON signals for turning on respective corresponding pixel transistors during a predetermined period are supplied to the respective corresponding pixel transistors;
- a plurality of groups of first coordinate detection electrodes which are arranged in a predetermined direction, at least two of the plurality of groups of the first coordinate detection electrodes corresponding to one of the scanning lines;
- first coordinate detection transistors, one of which electrically connects said at least two of the plurality of groups of the first coordinate detection electrodes corresponding to said one of the scanning lines to an output line commonly connected with the first coordinate detection transistors based on one of the ON signals supplied to the pixel transistors from said one of the scanning lines;
- a plurality of groups of second coordinate detection electrodes which are arranged along parallel lines perpendicular to the predetermined direction, at least two of the plurality of groups of the second coordinate detection electrodes corresponding to another one of the scanning lines; and
- second coordinate detection transistors, one of which electrically connects said at least two of the plurality of groups of the second coordinate detection electrodes corresponding to said another one of the scanning lines to the output line, which is commonly connected with the second coordinate detection transistors, based on one of the ON signals supplied to the pixel transistors from said another one of the scanning lines.

13. A liquid crystal display apparatus in which pixel electrodes connected with pixel transistors are arranged to face an opposed electrode through a liquid crystal layer per each pixel and art alignment direction of liquid crystal molecules in the liquid crystal layer is controlled by controlling a voltage applied to a space between the pixel electrodes and the opposed electrode, the liquid crystal display apparatus comprising:
- a scan driver which sequentially outputs ON signals for turning on the pixel transistors during a predetermined period to scanning lines extending in parallel to each other;
- a plurality of groups of first coordinate detection electrodes which are arranged in a predetermined direction, at least two of the plurality of groups of the first coordinate detection electrodes corresponding to one of the scanning lines
- first coordinate detection transistors, one of which electrically connects said at least two of the plurality of groups of the first coordinate detection electrodes corresponding to said one of the scanning lines to an output line commonly connected with the first coordinate detection transistors based on one of the ON signals supplied to the pixel transistors from said one of the scanning lines;
- a plurality of groups of second coordinate detection electrodes which are arranged along parallel lines perpendicular to the predetermined direction, at least two of the plurality of groups of the second coordinate detection electrodes corresponding to another one of the scanning lines; and second coordinate detection transistors, one of which electrically connects said at least two of the plurality of groups of the second coordinate detection electrodes corresponding to said another one of the scanning lines to the output line, which is commonly connected with the second coordinate detection transistors, based on one of the ON signals supplied to the pixel transistors from said another one of the scanning lines, wherein the pixel transistors, the first coordinate detection transistors, the second coordinate detection transistors, and the output line are formed on a same substrate.

* * * * *